(12) United States Patent
Belhumeur et al.

(10) Patent No.: US 11,640,234 B2
(45) Date of Patent: *May 2, 2023

(54) NAVIGATING DIGITAL CONTENT USING VISUAL CHARACTERISTICS OF THE DIGITAL CONTENT

(71) Applicant: Dropbox, Inc., San Francisco, CA (US)

(72) Inventors: Peter N. Belhumeur, New York, NY (US); David J. Kriegman, San Diego, CA (US); Thomas Berg, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,831

(22) Filed: Aug. 16, 2021

(65) Prior Publication Data

US 2022/0004290 A1    Jan. 6, 2022

Related U.S. Application Data

(63) Continuation of application No. 16/433,903, filed on Jun. 6, 2019, now Pat. No. 11,093,112, which is a
(Continued)

(51) Int. Cl.
*G06F 3/048* (2013.01)
*G06F 3/0482* (2013.01)
(Continued)

(52) U.S. Cl.
CPC ......... *G06F 3/0482* (2013.01); *G06F 3/0481* (2013.01); *G06F 3/0485* (2013.01);
(Continued)

(58) Field of Classification Search
CPC ................ G06F 3/0481; G06F 3/0482; G06F 3/04842; G06F 3/04845; G06F 3/0485;
(Continued)

(56) References Cited

U.S. PATENT DOCUMENTS 7,702,185 B2    4/2010  Keating et al.
8,031,914 B2   10/2011  Zhang
(Continued)

OTHER PUBLICATIONS

Final Office Action from U.S. Appl. No. 16/433,903, dated Dec. 1, 2020, 16 pages.
(Continued)

*Primary Examiner* — Claudia Dragoescu
(74) *Attorney, Agent, or Firm* — Keller Preece PLLC

(57) ABSTRACT

One or more embodiments of a digital content system allow a user to conveniently search and/or navigate through a collection of digital content items. In particular, a user can interact with a client device to search for and identify one or more digital content items within a collection of digital content items. For example, the digital content system may provide a photo from a collection of photos via a graphical user interface. The digital content system can receive a user input identifying a selection of one or more visual features within the photo. Based on the selected visual feature(s), the digital content system may identify photos from the collection of photos that include the identified visual feature(s) and provide access to the identified photos via the graphical user interface.

20 Claims, 16 Drawing Sheets

Related U.S. Application Data continuation of application No. 15/207,270, filed on Jul. 11, 2016, now Pat. No. 10,318,113, which is a continuation of application No. 14/699,513, filed on Apr. 29, 2015, now Pat. No. 9,448,704.

(51) Int. Cl.

| | | |
|---|---|---|
| *G06F 3/04842* | (2022.01) | |
| *G06F 3/0481* | (2022.01) | |
| *G06F 3/0485* | (2022.01) | |
| *G06F 16/54* | (2019.01) | |
| *G06F 16/532* | (2019.01) | |
| *G06F 16/538* | (2019.01) | |
| *G06V 10/46* | (2022.01) | |
| *G06F 3/04845* | (2022.01) | |
| *G06F 3/04883* | (2022.01) | |
| *G06F 16/50* | (2019.01) | |

(52) U.S. Cl.
CPC ...... *G06F 3/04842* (2013.01); *G06F 3/04845* (2013.01); *G06F 3/04883* (2013.01); *G06F 16/50* (2019.01); *G06F 16/532* (2019.01); *G06F 16/538* (2019.01); *G06F 16/54* (2019.01); *G06V 10/462* (2022.01); *G06F 2203/04806* (2013.01)

(58) Field of Classification Search
CPC ....... G06F 3/04883; G06F 2203/04806; G06F 16/50; G06F 16/532; G06F 16/538; G06F 16/54
See application file for complete search history.

(56) References Cited

U.S. PATENT DOCUMENTS

| | | | |
|---|---|---|---|
| 8,121,358 | B2 | 2/2012 | Weng et al. |
| 8,306,284 | B2 | 11/2012 | Goldberg et al. |
| 8,358,811 | B2 | 1/2013 | Adams et al. |
| 8,724,908 | B2 | 5/2014 | Dale et al. |
| 8,781,178 | B2 | 7/2014 | Nagaoka et al. |
| 8,907,984 | B2 | 12/2014 | Weber et al. |
| 9,448,704 | B1 | 9/2016 | Belhumeur et al. |
| 10,318,113 | B2 | 6/2019 | Belhumeur et al. |
| 2003/0090504 | A1* | 5/2003 | Brook ............... G11B 27/034 |
| 2003/0210808 | A1 | 11/2003 | Chen et al. |
| 2004/0264780 | A1 | 12/2004 | Zhang et al. |
| 2005/0168583 | A1* | 8/2005 | Thomason ........... H04N 5/2628 348/208.4 |
| 2007/0177805 | A1* | 8/2007 | Gallagher ........... G06V 40/172 707/E17.026 |
| 2008/0112621 | A1* | 5/2008 | Gallagher ........... G06V 40/172 382/190 |
| 2009/0219304 | A1 | 9/2009 | Martin et al. |
| 2010/0066822 | A1* | 3/2010 | Steinberg ........... G06V 40/167 382/118 |
| 2011/0129159 | A1 | 6/2011 | Cifarelli |
| 2011/0243397 | A1* | 10/2011 | Watkins ............. G06F 16/5854 715/830 |
| 2012/0182316 | A1 | 7/2012 | Moha et al. |
| 2012/0294520 | A1 | 11/2012 | Mei et al. |
| 2013/0132908 | A1 | 5/2013 | Lee et al. |
| 2013/0329114 | A1 | 12/2013 | Kim et al. |
| 2015/0185987 | A1 | 7/2015 | Tsai et al. |

OTHER PUBLICATIONS

Matusiak K.K., "Towards User-Centered Indexing in Digital Image Collections," University of Wisconsin-Milwaukee Libraries, vol. 22, No. 4, 2006, pp. 283-298.
Non-Final Office Action for U.S. Appl. No. 15/207,270 dated Jun. 22, 2018, 23 pages.
Non-Final Office Action from U.S. Appl. No. 16/433,903, dated Jul. 9, 2020, 20 pages.
Notice of Allowance from U.S. Appl. No. 16/433,903, dated Apr. 26, 2021, 9 pages.
Notice of Allowance for U.S. Appl. No. 14/699,513 dated May 6, 2016, 16 pages.
Notice of Allowance for U.S. Appl. No. 15/207,270 dated Jan. 29, 2019, 9 pages.
Office Action for U.S. Appl. No. 14/699,513 dated Aug. 20, 2015, 21 pages.
Office Action for U.S. Appl. No. 14/699,513 dated Jan. 7, 2016, 31 pages.

* cited by examiner

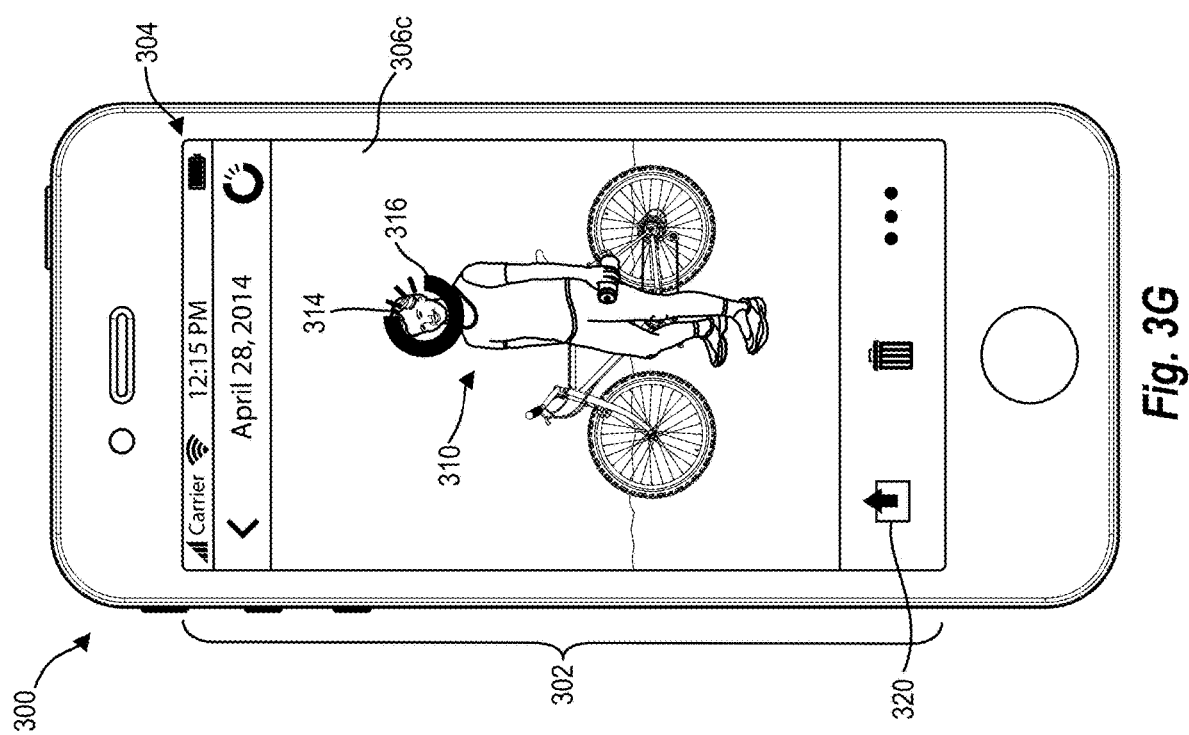

NAVIGATING DIGITAL CONTENT USING VISUAL CHARACTERISTICS OF THE DIGITAL CONTENT

CROSS-REFERENCE TO RELATED APPLICATIONS

The present application is a continuation of U.S. patent application Ser. No. 16/433,903, filed Jun. 6, 2019, which is a continuation of U.S. patent application Ser. No. 15/207,270, filed Jul. 11, 2016, now issued as U.S. Pat. No. 10,318,113, which is a continuation of U.S. patent application Ser. No. 14/699,513, filed Apr. 29, 2015, now issued as U.S. Pat. No. 9,448,704. The aforementioned applications are hereby incorporated by reference in their entirety.

BACKGROUND

1. Technical Field

One or more embodiments of the present disclosure generally relate to providing a gallery of digital content. More specifically, one or more embodiments disclosed herein relate to systems and methods for navigating a gallery of digital content and providing digital content based on one or more visual features within the digital content.

2. Background and Relevant Art

Computing devices (e.g., computers, tablets, smart phones) provide numerous ways for people to capture, create, share, view, and otherwise interact with numerous types of digital content. For example, many computing devices allow users to interact with digital content by capturing, sharing, and experiencing digital content (e.g., digital images, panoramas, videos). Overtime, a typical user can collect a large amount of digital content. As the amount of digital content increases, it becomes more difficult for the user to experience digital content in an efficient and enjoyable manner. In particular, conventional systems for presenting digital content have several disadvantages.

For example, many conventional systems do not allow a user to efficiently search and/or navigate a large number of digital content items. In particular, conventional systems generally provide a user interface that allows a user to browse digital content items by providing a display of digital content items (e.g., digital images) through which a user may navigate. Such systems may require a user to manually scroll through the entire collection to locate a particular digital content item (e.g., a particular digital image). As such, when a user collects hundreds, or perhaps thousands, of digital content items, the process of scrolling through the large number of digital content items to locate particular content can be time consuming, inefficient, and frustrating for a user.

Additionally, while many conventional systems incorporate search functions that enable a user to search a collection of digital content. Conventional search features typically require that a user provide specific search terms in locating digital content items of interest within the collection of digital content. As an example, where a user desires to locate a photo within a collection of photos, conventional systems often require that a user provide specific information (e.g., a date, folder location, or file name) corresponding to the photo of interest as part of a search query in order to retrieve or navigate directly to the photo. As such, if a user is unable to remember the necessary information that is particular to the photo(s) of interest, the conventional system may require that the user manually scroll through one or multiple galleries of images to locate a specific image. Requiring that a user recollect specific information (such as a date or file name) when searching a collection of digital content often results in a frustrating search or navigation experience for the user.

Furthermore, the information upon which a user can search through is typically limited to a small number of items such as the date, storage location, file name, etc. As such, if a user desires a photo that has certain characteristics (such as the best photo of the entire family), the search features of conventional systems are inadequate to aid in finding such a photo. Thus, despite the search capabilities, the user typically must manually scroll through their collection to find the desired photo.

Accordingly, there are a number of considerations to be made in searching and/or navigating digital content.

SUMMARY

Embodiments of the present disclosure provide benefits and/or solve one or more of the foregoing or other problems in the art with systems and methods for providing digital content to a user. For example, one or more embodiments include systems and methods for identifying one or more digital content items (e.g., photos, videos, audio) from a collection of digital content items that include an identified feature. In particular, the systems and methods described herein may enable selection of a visual feature of a digital content item. The systems and method can then identify digital content items from the collection of digital content items that include the identified visual feature.

Thus, one or more embodiments include features and functionality that enable a user to easily and efficiently search and/or navigate through a large number of content items. For example, a user may select a particular visual feature (e.g. an object within a photo) and a client device and/or online content management system may identify and provide a subset of digital content items from the collection having the selected visual feature. As such, a user may easily search a collection of digital content items and/or efficiently navigate to digital content items of interest based on a selected visual feature.

Further, one or more embodiments include features and functionality that allow users to select a visual feature via a graphical user interface provided on a client device. In particular, one or more embodiments include providing a digital content item to the user via a graphical user interface and enabling the user to select a visual feature from the digital content item via the graphical user interface. Thus, rather than typing a search query including a date, folder location, file name, and/or other specific metadata, a user may search or filter the collection of digital content items as part of navigating the collection of digital content items.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings.

FIGS. 3A-3G illustrate graphical user interfaces showing a search for content items having a selected visual feature in accordance with one or more embodiments;

DETAILED DESCRIPTION

Figure 1:
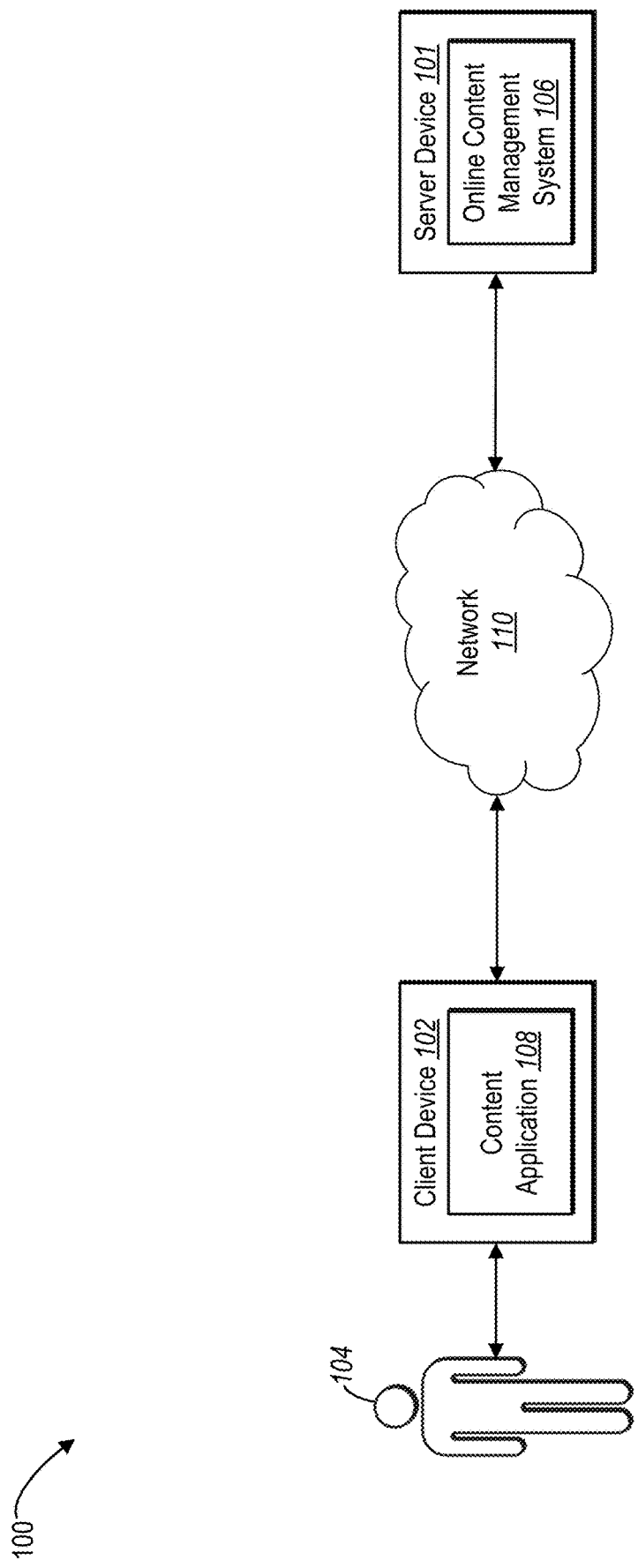
FIG. 1 illustrates a block diagram of an environment for implementing a digital content system in accordance with one or more embodiments.

The present disclosure provides one or more embodiments of a digital content system that allows a user to efficiently and intuitively search and/or navigate a collection of digital content. In particular, the digital content system allows a user to search for, and identify, one or more digital content items (e.g., photos, videos, audio) within a collection of digital content items based on visual features of the digital content items. For example, in one or more embodiments, the system may provide a digital content item from a collection of digital content items via a graphical user interface. The system may further receive a selection of one or more visual features of the digital content item. Based on the selected visual feature(s), the system may identify and provide additional digital content items from the collection of digital content items that also have the visual feature(s).

In one or more embodiments, the digital content system can allow for efficient searching and/or navigating of digital content. In particular, the system can allow a user to select a visual feature included within a digital content item (e.g., within a display of a digital content item) and identify each digital content item within a collection of digital content items that includes the selected visual feature. Upon identifying the digital content items including the selected feature, the system may provide access to the identified digital content items via a graphical user interface. As such, rather than scrolling through a collection of digital content items to locate a specific content item, the user may select a visual feature and navigate directly to any number of digital content items containing the specific visual feature.

Furthermore, the digital content system may enable a user to select and/or otherwise identify any number of visual features within a digital content item and, in some embodiments, perform an incremental search for each of the selected visual features. For example, the system may receive a first user input identifying a selection of a first visual feature. Based on the selection of the first visual feature, the system can identify a first subset of digital content items that include the selected first visual feature. Further, the system may receive a second user input identifying a selection of a second visual feature. Based on the selection of the first visual feature, the system can identify a second subset of digital content items from the first subset of digital content items that includes digital content items that have both the first visual feature and the second visual feature. The user may further narrow the search by selecting additional visual features. Alternatively, a user may broaden a search by deselecting a previously selected visual feature and/or selecting an alternative visual feature.

Additionally, one or more embodiments of the system allow for convenient selection of visual features via a graphical user interface. In particular, one or more embodiments of the system avoid requiring a user to recollect a date, folder location, file name, or other metadata by enabling the user to interact with a digital content item in selecting a visual feature provided via a graphical user interface. In particular, rather than requiring that the user enter a search query and/or recollect specific metadata about a digital content item of interest, the system allows a user to interact with a digital content item to select a visual feature and perform a search and/or navigate a collection of digital content items based on the selected visual feature. As an example, the system can provide an image via a graphical user interface from which a user can select a visual feature. Thus, the system allows a user to search or filter a collection of digital content items while browsing or navigating the collection rather than having to use a search bar or perform a search of folders.

In a first example embodiment, the digital content system may enable a user to efficiently search and/or navigate a collection of images by receiving a selection of one or more faces. The digital content system can then identify images within the collection that include people or faces corresponding to the selected face(s). For example, the system may provide an image via a graphical user interface on a client device that includes a face of a person and enable a user to select the face via a user input (e.g., a touch gesture). In response to receiving the user selection of the face, the system may identify each image within the collection that includes a face of the person corresponding to the selected face. In one or more embodiments, the system may identify the images having the selected face(s) by performing facial recognition on each image within the collection of images. Alternatively, the system may identify one or more images that have been tagged as including the selected face (or person corresponding to the selected face).

In addition, as mentioned above, the system may perform a subsequent search for each additional face selected by a user. For example, in response to a user selecting a first face of a person, the system may identify a first subset of images that include the first face (or person corresponding to the first face). While scrolling through the first subset of images, the user may select a second face. The system can then identify a second subset of images that include both the first face and the second face. Thus, in an example where a user is scrolling through images and selecting faces of the user's children, the user may incrementally select faces of each of the user's children and identify each image within a collection of images that includes some or all of the user's children.

In addition to enabling a user to search and/or navigate based on selected and identified faces, one or more embodiments of the system may enable a user to search and/or identify digital content items including one or more objects other than faces. For example, instead of receiving a selection of a face, the system may enable a user to select a type of object and identify each digital content item within a collection of digital content items that includes an object corresponding to the selected type of object. As an example, the system may receive a user selection of a bicycle from within an image provided via a graphical user interface. In response, the system can identify and provide access to any image within a collection of images that includes a bicycle or a similar object (e.g., motorcycle).

Moreover, in one or more embodiments, the system may enable a user to scrub through a gallery of digital content items and experience the digital content items or, alternatively, portions of the digital content items including a selected visual feature. For example, where a user selects a face of a person within an image of a collection of images, the system may cause the client device to provide an option for the user to scrub through each of the images that include the selected face. In particular, the system may cause the client device to present selected images in a variety of ways. For example, in scrubbing through the images, the client device may display a full image of each selected image. Alternatively, in one or more embodiments, the client device may display, overlay, or provide in conjunction with a respective image, a portion of each identified image that include the selected visual feature(s).

In respect to videos, one or more embodiments allow a user to select a visual feature (e.g., a face) from a frame of a video. The system can then identify each frame within the video that includes the visual feature and filter out the frames that do not include the feature. As such, a user can identify one or more objects, faces, or other visual features within a video and watch only those portions of the video that include the identified visual feature(s). In particular, the user can manually scrub through the video to see only the portions (e.g., frames) that include the visual feature. In such embodiments, upon the user stopping the scrub, the system can play either the entire video from that point forward or only the frames of the video including only the identified visual feature.

Alternatively, one or more embodiments allow a user to select a visual feature (e.g., a face) from a frame of a video. The system can then identify each video within a plurality of videos that includes the visual feature and filter out the videos that do not include the feature. Thus, in one or more embodiments the user can select a granularity of the item(s) being filtered.

As used herein, "digital content" refers to any digital data. For example, the terms "digital content item," "content item," and "digital item" can include a defined portion of digital data (e.g., a data file). Examples of digital content items include, but are not limited to, digital images, digital video files, digital audio files, electronic document files of all types, streaming content, contact lists, and/or folders that include one or more digital content items. The term "digital content item," "content item," and "digital item" may refer interchangeably to the digital content items themselves or portions thereof. For example, a frame of a video can comprise a digital content item or the entire video. Additionally, digital content items can include representations, such as reduced-sized versions of digital content items (e.g., thumbnail images, low-quality audio files, compressed video files).

Additionally, as used herein, a "collection of digital content" (or simply "collection") refers to any defined group of digital content items. A collection can include a single type of digital content item or multiple different types of digital content items. Additionally, a collection can include as few as one content item, but in many instances, a collection can include a large number of content items. For example, a video can comprise a collection of digital content items (i.e., individual frames). Alternatively, a plurality of videos can comprise a collection of digital content items (i.e., individual videos). Although the present disclosure provides specific examples related to digital image collections (e.g., photos and videos), one will appreciate that the principles described herein may be applied to other types of collections of digital content, such as a music collections, document collections, and/or any other type of digital content collection.

In one or more embodiments, the system can provide a collection of digital content items via a graphical user interface. As used herein, a gallery of digital content items, or simply "gallery," refers to a presentation of a collection, or a portion of a collection, of digital content items within a graphical user interface. In particular, a gallery of digital content items can allow a user to browse a collection of digital content by navigating within the gallery (e.g., scrolling the gallery of digital content items through a view area of the graphical user interface). A gallery can have various formats depending, for instance, on the type of digital content items included in a collection. For example, a gallery can have a grid of images in a collection of digital images. Alternatively, a gallery of document files can be formatted into a list of file names.

Additionally, as used herein, a "visual feature" may include any feature or characteristic depicted by or included within a digital content item. In particular, a visual feature may include a visually identifiable feature or characteristic detected by a client device, online content management system, or other computing device. Additionally, a visual feature may include a feature or characteristic identified or confirmed by a user. Examples of visual features include, but are not limited to, faces, times, locations, landmarks, events, or objects (e.g., vehicles, trees, mountains, buildings) included within a digital content item. Additionally, in one or more embodiments, visual features may include visual characteristics of a digital content item, such as colors, resolution, texture, materials, orientation (e.g., portrait, landscape, panoramic), or other characteristics associated with the appearance or presentation of a digital content item.

Additional features and characteristics of one or more embodiments of a digital content system are described below with respect to the Figures. For example, FIG. 1 illustrates a block diagram of an example embodiment of digital content system 100 (or simply "system 100"). In general, and as illustrated in FIG. 1, system 100 can include client device 102 that is associated with user 104. Client device 102 may communicate with server device 101 via network 110. Additionally, as shown in FIG. 1, client device 102 may include content application 108 and server device 101 may include online content management system 106. In some embodiments, client device 102 can perform or provide various functions, features, processes, and systems as described herein. Additionally, or alternatively, server device 101 can perform or provide one or more of the various functions, features, processes, and systems described herein. In one or more embodiments, client device 102 and content application 108 may coordinate with server device 101 and online content management system 106 to perform or provide the various functions, features, processes, and systems, as described in more detail below.

Generally, client device 102 may include any one of various types of client devices. For example, client device 102 can be a mobile device (e.g., smart phone), tablet, laptop computer, desktop computer, or any other type of computing device as further explained below with reference to FIG. 9. Client device 102, server device 101, and network 110 may communicate using any communication platforms and technologies suitable for transporting data and/or communication signals, including any known communication technologies, devices, media, and protocols supportive of remote data communications, examples of which are also described below with reference to FIG. 9.

As an initial overview of one or more embodiments of system 100, client device 102 can obtain one or more digital content items. In particular, client device 102 can capture, store, receive, or otherwise access multiple digital content items. For example, user 104 can take a photo using client device 102 (e.g., a smart phone). Furthermore, client device 102 can maintain the photo or a copy of the photo within storage on client device 102. Additionally, client device 102 can receive digital content items from various sources, such as electronic communications from other users (e.g., email, IM, SMS text), websites, digital content servers (e.g., server device 101), and/or any other source of digital content with which client device 102 may communicate. In addition, client device 102 can organize the obtained digital content items into one or more collections of digital content.

In one or more embodiments, client device 102 may share one or more digital content items with server device 101 via network 110. For example, and as illustrated in FIG. 1, client device 102 can provide access to digital content items and/or copies of digital content items to online content management system 106 by sending, sharing, or otherwise providing digital content items to server device 101. In some embodiments, system 100 can cause client device 102 and online content management system 106 to synchronize digital content items maintained on client device 102 and/or server device 101. Additional detail and explanation relating to one or more embodiments of server device 101 and online content management system 106 are discussed below with reference to FIG. 11.

In some embodiments of system 100, client device 102 and server device 101 may facilitate providing client device 102 with access to large amounts of digital content, while simultaneously reducing the amount of used storage on client device 102. In particular, client device 102 can provide full- or high-resolution versions of digital content items to online content management system 106, and as a result, the client device 102 can remove some or all of a collection of full- or high-resolution digital content items from client device 102 to reduce used storage. As used herein, "full-resolution" or "high-resolution" digital content items may refer to high-quality versions of digital content items. Typically, full- or high-resolution digital content items have larger file sizes, and therefore, increase the amount of storage needed on client device 102. In many cases, a full- or high-resolution version of a digital content item is the original version of a digital content item (e.g., the data image file resulting from capturing a digital image).

In some embodiments, system 100 can cause client device 102 to provide one or more digital content items to user 104. In particular, client device 102 may present a collection of digital content items to user 104 via a graphical user interface on client device 102. For example, client device 102 may present a gallery of photos including one or more photos stored on client device 102 and/or one or more photos accessible via online content management system 106. In some embodiments, client device 102 may provide photos from a collection of photos one at a time via a graphical user interface. Alternatively, client device 102 may display multiple photos or reduced resolution photos (e.g., thumbnails) via the graphical user interface.

Thus, the system 100 can receive high-resolution images from content application 108 (or other sources such as other client devices associated with the user) and send or sync a low-resolution image to client device 102. As used herein, the term "low-resolution image" refers to an image with a lower resolution than a "high-resolution image." In particular, a "low-resolution image" can include an image generated by reducing the resolution or quality of a "high-resolution image." More particularly, in one or more embodiments a "low-resolution image" can comprise a thumbnail image (e.g., about 75×75 pixels) or a full screen image for a hand-held device (e.g., about 320×568 pixels). In one or more embodiments a "low-resolution image" has a resolution less than about 250 kilo-pixels. Alternatively, a "low-resolution image" can have a resolution between about 2.5 kilo-pixels and about 250 kilo-pixels.

As used herein, the term "high-resolution image" refers to an image with a higher resolution than a "low-resolution image." A high-resolution image can have a resolution sufficiently high to allow for quality printing. For example, in one or more embodiments a "high-resolution image" can have a resolution of greater than about 250 kilo-pixels. Furthermore, in one or more embodiments a "high-resolution image" can comprise a full or original resolution image (i.e., a resolution as originally captured). In still further embodiments a "high-resolution image" can have a resolution greater than a full or original resolution due to one or more modifications or enhancements.

System 100 may store high-resolution images on server 101 or in a cloud storage space that is separate from client device 102. Additionally, system 101 can provide low-resolution images corresponding to any stored high-resolution images. One will appreciate in light of the disclosure herein that system 100 can thus free up space on client device 102.

For example, user 104 can capture high-resolution images with client device 102. Content application 108 can transfer the high-resolution images to online content management system 106. Online content management system 106 can provide client device 102 with a corresponding low-resolution image. User 104, if desired, can then delete the high-resolution images from client device 102 to free up storage space and allow for the local storage of more images. As the high-resolution images are stored by online content management system 106, user 104 can access or download them at later time if desired. Alternatively, user 104 can leave the high-resolution image on client device 102.

Along related lines, online content management system 106 can sync low-resolution images across multiple client devices associated with a user or a group of users. For example, online content management system 106 can send a low-resolution image to user's phone, tablet, and laptop or other device in which the user has installed content application 108. Thus, online content management system 106 can allow the user to access and view the low-resolution image more readily.

Client device 102 may also include one or more features that enable user 104 to interact with the collection of digital content items. For example, user 104 may navigate or scroll through one or more galleries of digital content items accessible to client device 104. Further, in some embodiments, user 104 may interact with one or more digital content items provided via the graphical user interface and identify and/or confirm one or more visual features included within various digital content items. Further, as will be described in greater detail below, user 104 may interact with one or more digital content items to select or otherwise identify one or more visual features of various content items.

In addition to providing digital content items to user 104, client device 102 may receive a selection of one or more visual characteristics corresponding to one or more digital content items. For example, user 104 may select, indicate, or otherwise identify a visual feature via a graphical user interface on client device 102. In some embodiments, user 104 may select a visual feature included within a presentation of a digital content item displayed on client device 104. For example, user 104 may select a face (or other object) included within a displayed digital content item. In one or more embodiments, user 104 may select a face by tapping, clicking, or otherwise selecting the face within a presentation of a digital content item. Alternatively, user 104 may select one or more options of visual features presented via a menu (e.g., drop-down menu), list, or other display provided to user 104 via a graphical user interface on client device 102.

In response to receiving the selection of the visual feature, system 100 may cause client device 102 and/or server device 101 to identify one or more digital content items that include the selected visual feature. As an example, client device 102 may identify each digital content item within a collection of digital content items that include the selected visual feature. Identifying each digital content item with the visual feature may include analyzing each digital content item within the collection and detecting the visual feature within one or more digital content items. In some embodiments, identifying digital content items that include a selected visual feature may include scanning or otherwise analyzing a collection of digital content items for which one or more visual features that have been previously identified (e.g., tagged) and identifying which of the previously analyzed digital content items include the selected visual feature.

Upon identifying each digital content item within the collection of digital content items that includes the visual feature, system 100 may cause client device 102 to provide access to the identified digital content item(s) to user 104. In particular, client device 102 may present a gallery of digital content items representing each of the digital content items from the collection that include the selected visual feature. As an example, where the selected visual feature is the face of a person, client device 102 may present each photo of a collection of photos that includes a tagged, detected, or otherwise identified face of the person and filter out any additional photos that do not include a face corresponding to the person.

Figure 2:
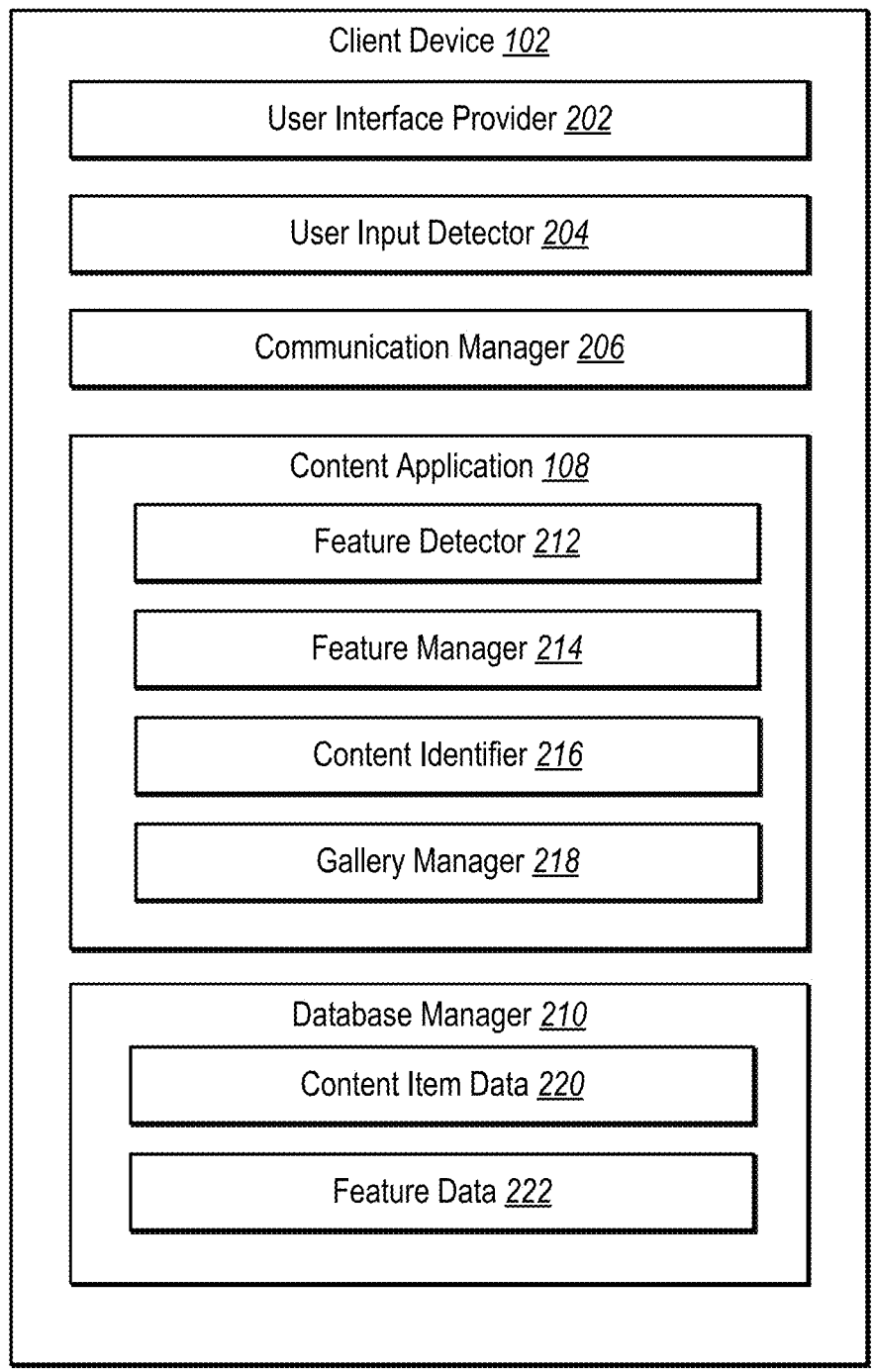
FIG. 2 illustrates a schematic diagram of a client device upon which a least a portion of a digital content system is implemented in accordance with one or more embodiments.

FIG. 2 illustrates an example embodiment of client device 102 that may operate within digital content system 100 described with respect to FIG. 1. As shown, client device 102 may include, but is not limited to, user interface provider 202, user input detector 204, and communications manager 206. In addition, client device 102 can include content application 108, which includes feature detector 212, feature manager 214, content identifier 216, and gallery manager 218. As shown in FIG. 2, client device 102 may also include database manager 210, which may include content item data 220 and feature data 222.

Each of components 202-210 of client device 102 may be in communication with one another using any suitable communication technologies. In addition, although components 202-210 are shown separately in FIG. 2, any of components 202-210 may be combined into fewer components, such as into a single component, or divided into more components as may serve a particular embodiment. In addition, components 202-210 may be located on, or implemented by, one or more computing devices, such as one or more client devices and/or one or more server devices (e.g., online content management system 106). For example, one or more features and functionality described in connection with content application 108 and/or database manager 210 on client device 102 may also apply to one or more corresponding components on online content management system 106.

Each of components 202-210 can comprise software, hardware, or both. For example, each of components 202-210 can comprise one or more instructions stored on a computer-readable storage medium and one or more processors of one or more computing devices to execute instructions. When executed by the one or more processors, the computer-executable instructions cause a computing device to perform the methods described herein. Alternatively, components 202-210 can comprise hardware, such as a special purpose processing device to perform a certain function or group of functions.

As mentioned above, and as shown in FIG. 2, client device 102 can include user interface provider 202. User interface provider 202 can provide a graphical user interface (or simply "user interface") that allows user 104 to navigate, browse, view, share, manage, and/or otherwise experience digital content using client device 102. For example, user interface provider 202 can provide a user interface that facilitates a presentation of digital content on client device 102 (e.g., on a display screen). Likewise, user interface provider 202 can provide a user interface that facilitates navigating a gallery of digital content items. For example, user interface provider 202 can provide a user interface that allows user 104 to scroll through and perform a search of a collection of digital content items.

More specifically, user interface provider 202 may provide (e.g., by way of a display screen associated with client device 102) a variety of interactive elements within the user interface. For example, user interface provider 202 can cause client device 102 to present one or more graphical objects that represent digital content items. For instance, in one or more embodiments, user interface provider 204 can present low-resolution versions of digital images (e.g., thumbnails). Alternatively, user interface provider 202 may facilitate a presentation of other types of digital content (e.g., audio, videos, webpages, documents), depending on the particular application of content application 208.

As further illustrated in FIG. 2, client device 102 can include user input detector 204. In one or more embodiments, user input detector 204 can detect, identify, and/or receive a user interaction and translate the user interaction into a user input (e.g., a user command or request). As referred to herein, a "user interaction" refers to a single interaction, or combination of interactions, received from user 104 by way of one or more input devices. In some embodiments, user input detector 204 can translate a combination of user interactions as a single user input and/or translate a single user interaction into multiple user inputs.

For example, user input detector 204 can detect a user interaction from a keyboard, mouse, screen, or any other input device as a part of or in communication with client device 102. In the event a touch screen is used as an input device, user input detector 204 can detect one or more touch gestures (e.g., swipe gestures, tap gestures, pinch gestures, or reverse pinch gestures) that user 104 provides via the touch screen. In one or more embodiments, user 104 can provide one or more touch gestures in relation to and/or directed at one or more visual features (e.g., graphical objects, items, elements or other characteristics) of a digital-content items provided via a user interface presented on a touch screen. User input detector 204 may additionally, or alternatively, receive data representative of a user interaction. For example, user input detector 204 can receive one or more user configurable parameters from user 104, one or more user commands from user 104, and/or any other suitable user input.

User interface provider 202 can utilize user input and/or other data received from-user input detector 204 to manage, control, and/or facilitate the use of a user interface. In general, in response to user input detector 204 detecting one or more user interactions, user interface provider 202 can provide a user interface that allows user 104 to view, search, edit, share, and/or otherwise experience digital content within a user-friendly and intuitive user interface. For example, in response to user input detector 204 detecting one or more touch gestures, user interface provider 202 may allow user 104 to navigate and/or search through a gallery of digital content items provided via a user interface. Additionally, as will be explained in greater detail below, user input detector 204 may detect a user input identifying a selection of one or more visual features of a digital content item provided via the user interface. For example, where client device 102 includes a touchscreen, user input detector 204 may detect a touch gesture with respect to a feature or characteristic of the digital content item and identify a user selection of a visual feature of the digital content item.

As mentioned above, and as illustrated in FIG. 2, client device 102 may further include communication manager 206. Communication manager 206 can facilitate receiving and sending data to and from the client device 102. In particular, communication manager 206 can facilitate sending and receiving electronic communications. For example, the communication manager 206 can package content to be included in an electronic communication and format the electronic communication in any necessary form that is able to be sent through one or more communication channels and using an appropriate communication protocol, as described herein.

Furthermore, communication manager 206 can facilitate requesting and receiving digital content from sources outside client device 102. To illustrate, upon a user interacting with a digital content item within a collection of digital content items, communication manager 206 can request a selected digital content item from online content management system 106. Thus, communication manager 206 can request and receive digital content items, or other information, from sources inside or outside client device 102.

Furthermore, as mentioned above, FIG. 2, client device 102 can include content application 108. Content application 108 may include an application associated with managing digital content 208 on client device 102 and/or digital content accessible through online content management system 106. In particular, content application 108 can be a stand-alone or native application that can be installed and executed on client device 102 to facilitate interaction between user 104 and digital content items as well as between client device 102 and online content management system 106. In one or more embodiments, client application 208 can access application functions, client device functions, and/or online content management system 106 functions to accomplish one or more of the methods and process described herein.

While FIG. 2 specifically illustrates content application 108 implemented on client device 102, it is appreciated that one or more components of content application 108 may be implemented on online content management system 106 (e.g., server 101) or other systems in communication with client device 102. As such, features and functionality described herein with respect to content application 108 may be performed on client device 102 via content application 208, on server device 101 via online content management system 106, or combination of the two.

As illustrated in FIG. 2, content application 108 may include feature detector 212 that detects visual features included within digital content items. For example, feature detector 212 can analyze a digital content item and identify one or more visual features based on a portion of the digital content item displayed, presented, or otherwise experienced by the user (e.g., via a graphical user interface on client device 102). Additionally or alternatively, in one or more embodiments, feature detector 212 can analyze information associated with a digital content item (e.g., metadata) and identify one or more visual features based on the associated information.

Feature detector 212 may detect various visual features of digital content items using a variety of methods and techniques. As an example, where visual features include faces of people included within the digital content item(s), feature detector 212 may perform facial recognition on one or more digital content items within a collection. In particular, feature detector 212 may cause client device 102 or online content management system 106 to analyze a digital content item to detect various faces within the digital content item and further determine or predict whether a detected face corresponds to a particular person or profile (e.g., a user profile associated with the person).

More specifically, feature detector 212 may cause client device 102 and/or online content management system 106 to execute one or more facial analysis techniques used in performing facial recognition on digital content items. As an example, feature detector 212 may detect a face from within an image and determine the identity of a person corresponding to the face. In one or more embodiments, determining an identity of a person based on a face may include comparing one or more features of a detected face with a previously identified face known to correspond to a particular person or profile. For example, feature detector 212 may compare a detected face with one or more images of an identified person or profile and determine whether the detected face belongs to the same person or profile as the previously identified face. Alternatively, where a detected face does not correspond to a known person or profile, feature manager 212 may create a profile for a person and associate the detected face with the created profile or person. In still further embodiments, feature detector 212 can provide a suggestion of a profile of a person to which a detected face corresponds. In such embodiments, user 104 can confirm that the detected face corresponds to the suggested profile. Alternatively, user 104 can indicate that the detected face corresponds to another person or profile. Based on the prior confirmations of detected faces, feature detector 102 can use machine-learning techniques to identify or recognize further faces.

In addition to performing facial recognition and identifying specific people or profiles corresponding to detected faces, feature detector 212 may perform various recognition techniques to identify different features or objects within digital content items other than faces. For example, feature detector 212 may analyze an image and detect various characteristics of the digital content item such as colors, resolution, orientation or other characteristics. Additionally, feature detector 212 may analyze an image and detect various objects within the image such as faces, landmarks, buildings, landscapes, vehicles, or other objects. Further, feature detector 212 may identify any number of objects and characteristics within a particular digital content item.

As mentioned above, feature detector 212 may cause client device 102 and/or server device 101 to implement facial recognition or various object or character recognition processes based various factors. In particular, feature detector 212 may cause client device 102, server device 101, or a combination of components on client device 102 and server device 101 to perform various recognition processes based on availability of software, processing capabilities, connectivity between client device 102 and online content management system 106, or other considerations. As a first example, feature detector 212 may cause online content management system 106 to perform facial recognition where client device 102 does not have facial recognition software installed thereon. In another example, feature detector 212 may cause online content management system 106 to perform facial recognition to conserve limited processing power and storage space on client device 102. In another example, feature detector 212 may cause online content management system 106 to perform various recognition techniques based on detecting a network connection between client device 102 and online content management system 106.

As mentioned above, feature detector 212 may use one or a combination of client device 102 and server device 101 to perform different recognition processes. For example, where facial recognition processes may require more processing power than other recognition processes, feature detector 212 may cause online content management system 106 to perform any recognition process related to identifying and/or associating detected faces of digital content items. Additionally, feature detector 212 may cause client device 102 to perform various recognition processes for identifying and associating more simple objects with digital content items such as vehicles, trees, buildings, colors, or other objects that may be detected using less processing power than performing facial recognition.

As described above, feature detector 212 may detect visual features based on a portion of digital content items that are displayed, presented, or otherwise experienced by a user as well as based on other information (e.g., metadata) associated with the digital content items. More specifically, in one or more embodiments, feature detector 212 may analyze an image that represents a digital content item or a digital content item that is displayed on client device 102 and identify any number of visual features based on an analysis (e.g., facial detection, object detection) of the image as presented via a graphical user interface on client device 102. Additionally, feature detector 212 may detect various visual features based on metadata associated with respective digital content items. For example, metadata may provide indications of visual features including, for example, location, events, resolution, orientation, time of receipt by client device 102, or other characteristics associated with the appearance or presentation of a digital content item that feature detector 212 may use in detecting visual features. In one or more embodiments, visual features may include a combination of different detected characteristics or objects.

Additionally, as illustrated in FIG. 2, content application 108 may include feature manager 214 that associates, links, and otherwise manages detected visual features of digital content items. In particular, feature manager 214 may associate or link detected visual features with respective digital content items. For example, upon detecting a visual feature of a digital content item, feature manager 214 may assign or associate a tag or other identifier for the visual feature with the respective digital content item. In one or more embodiments, feature manager 214 may store or associate the identifier or tag of the visual feature with metadata or other information maintained on database manager 210.

In associating visual features with digital content items, feature manager 214 may automatically store, assign, or otherwise associate a detected visual feature with a respective digital content item upon detecting the visual feature. For example, in response to feature detector 212 detecting a face and identifying or predicting that the face corresponds to a specific person or profile, feature manager 214 may tag the digital content item with the identified face and/or identity of the person or profile. In one or more embodiments, feature manager 214 may associate or tag the digital content item with an identifier of a visual feature without receiving user input.

Alternatively, in one or more embodiments, associating a visual feature with a respective digital content item may further include receiving a user input confirming the identified or predicted association between the visual feature and the digital content item. For example, where a detected face does not correspond to a specific person or profile, feature manager 214 may cause client device 102 to provide a selectable option to user 104 via the graphical user interface of client device 102 that enables user 104 to indicate that the detected face belongs to a known person or profile. Additionally, feature manager 214 may cause client device 102 to receive a user input to edit, change, or add additional information for use in accurately associating the visual feature with the digital content item.

Moreover, even where a detected face corresponds to a person or profile, feature detector 212 may inaccurately predict that the face corresponds to a particular person or profile. For example, to avoid inaccurately associating a face with a particular person, feature manager 214 may cause client device 102 to provide a selectable option via a graphical user interface and receive a user input indicating that the association between the identified face and the specific person is correct or incorrect. Additionally, feature manager 214 may cause client device 104 to provide an option for user 104 to correct an inaccurately predicted association and/or provide a user input providing correct information that links, tags, or otherwise associates the detected face with a correct person or profile.

In addition to associating faces with respective profiles or people, feature manager 214 may further associate detected objects and other characteristics with digital content items. Additionally, similar to detected faces, feature manager 214 may cause client device 102 to receive user input(s) confirming, denying, and/or providing additional information with respect to the accuracy of a detected object, characteristic, or any other detected visual feature of a digital content item. Additionally, as will be explained in greater detail below, feature manager 214 may further associate identified visual features with different categories or types of visual features that may be used in identifying broad or narrow categories of visual features when searching and/or navigating a collection of digital content items.

As will be described in greater detail below, once client device 102 detects or otherwise identifies one or more visual features within digital content items, client device 102 may enable a user to select a visual feature from a digital content item. For example, user interface provider 202 may provide a display of a digital content item via a graphical user interface on client device 102. Further, user input detector 204 may receive a user input that identifies a previously detected and associated visual feature within the digital content item. For example, a user may select a face or other object within a digital content item using a tap gesture on a touchscreen of client device 102. Additional details with regard to selecting one or more visual features will be described in further detail below.

Additionally, as illustrated in FIG. 2, content application 108 may include content identifier 216 that identifies one or more digital content items based on one or more visual features. In particular, in response to receiving a user input identifying a visual feature, content identifier 216 can identify each digital content item within a collection of digital content items that includes the selected visual feature. In one or more embodiments, content identifier 216 may cause other components of content application 108 to detect and assign visual features in response to receiving a user input identifying a visual feature and identify the digital content items including the selected visual feature based on the analysis. Alternatively, various components of content application 108 may detect and associate visual features with respective digital content items prior to receiving the user input identifying the selected visual feature.

In one or more embodiments, identifying digital content items may involve analyzing and identifying stored associations between visual features and digital content items. For example, in response to receiving a user input identifying a visual feature, content identifier 216 may determine that one or more tags correspond to the visual feature identified by the user input and view association information assigned to digital content items to identify the one or more tags that correspond to the identified visual feature. More specifically, content identifier 216 may identify each digital content item within a collection of digital content items that have been associated (e.g., tagged) with the identified visual feature.

Additionally, as illustrated in FIG. 2, content application 108 may further include gallery manager 218 that provides access to one or more identified digital content items in accordance with one or more embodiments described herein. For example, gallery manager 218 may provide access to a collection of digital content items to user 104 via a graphical user interface on client device 102. For instance, gallery manager 218 may provide a gallery of images or thumbnails that represent a collection of digital content items via the graphical user interface of client device 102. In one or more embodiments, gallery manager 218 may provide access to each digital content item one at a time (e.g., a slide show) via a graphical user interface on client device 102. Alternatively, gallery manager 218 may provide a presentation of digital content items via an image gallery or display of multiple images on the graphical user interface.

Additionally, in response to identifying digital content items that include an identified visual feature, gallery manager 218 may provide access to each of the digital content items via a graphical user interface on client device 102 based on the identified visual feature. For example, gallery manager 218 may provide a gallery of images or thumbnails that represent each of the identified digital content items. Additionally or alternatively, as will be described in greater detail below, gallery manager 218 may provide an image or thumbnail that represents a portion (e.g., a cropped portion) of an identified digital content item and that includes or emphasizes the identified visual feature. As an example, where an identified visual feature is a face of a person, gallery manager 218 may provide a thumbnail or higher resolution cropped image that includes a portion (e.g., a cropped portion and/or a zoomed in portion) of the corresponding digital content item including the face of the person.

Moreover, gallery manager 218 may enable user 104 to scrub through one or more identified digital content items (or portions of digital content items) in a variety of ways. For example, gallery manager 218 may provide each identified digital content item and/or a cropped portion of each identified digital content item via the graphical user interface of client device 102 one digital content item at a time in succession. Additionally, gallery manager 218 may pause or stop scrubbing through the digital content items in response to a user input or upon reaching the final identified digital content item. Further, gallery manager 218 may provide access to the identified digital content items in any order based on chronology (e.g., a time stamp indicating when the digital content item was captured or received by client device 102), similarity of detected visual features, proximity of identified digital content items with respect to a presently displayed digital content item, size or quality of digital content item, similarity of other identified objects with respect to the identified object, geolocation, digital tags, or other criteria.

Further, in one or more embodiments, gallery manager 218 may enable user 104 scroll, scrub, or otherwise navigate a gallery of identified digital content items according to a variety of methods. For example, user 104 may scroll through a gallery of photos by swiping each photo displayed on client device 102. In another example, user 104 may scroll through a gallery of photos by selecting a scroll bar (e.g., a side bar) and browsing photos by moving the scroll bar. In another example, user 104 may scroll through the gallery of photos by interacting with an interface control or a graphic on client device 104 or user input device. Content application 108 may further include other methods of scrolling through or otherwise navigating through a gallery of digital content items.

Additionally, as will be described in greater detail below, one or more embodiments of content identifier 216 and gallery manager 218 may enable incremental searching of multiple visual features of a collection of digital content items. For example, in response to receiving a user input identifying a first visual feature, content identifier 216 may identify a first subset of a collection of digital content items that each include the first visual feature. Additionally, gallery manager 218 may provide a gallery of digital content items representing the subset of identified digital content items. Further, as will be described in greater detail below, in response to receiving a user input identifying a second visual feature, content identifier 216 may identify a second subset from the first subset of digital content items that includes both the first visual feature and the second visual feature. Additionally, gallery manager 218 may provide another gallery that includes only those digital content items that have both the first and second visual features. Additionally, in one or more embodiments, content identifier 216 and gallery manager 218 may facilitate performing additional searches upon receiving additional user inputs that identify additional or alternative visual features.

As mentioned above, and as shown in FIG. 2, client device 102 can include data storage 210 including content data 220 and feature data 222. In particular, content data 220 may include any information associated with digital content items. For example, content data 220 may include images (e.g., high resolution original(s), low resolution copies, thumbnails, cropped portions) associated with respective digital content items. Further, content data 220 may include metadata or other information associated with digital content items. Additionally, feature data 222 may include information associated with various visual features including, for example, tags, associations, categories, or identifiers of digital content items that may be used to associate visual features with digital content items and/or identify digital content items that include detected visual features. Additionally, in one or more embodiments, feature data 222 may include a library of faces and/or objects (e.g., common objects) that have been detected within a collection of digital content items.

In one or more embodiments, content item data 220 and feature data 222 may be stored and maintained on client device 102. Alternatively, content item data 220 and feature data 222 may be stored and maintained on online content management system 106 which provides access to client device 102 to content item data 220 and feature data 222. Additionally, in one or more embodiments, some content item data 220 and feature data 222 may be maintained on client device 102 while some content item data 220 and feature data 222 is maintained on online content management system 106. As an example, original and higher resolution digital content items may be stored on a database on online content management system 106 while lower resolution copies and/or thumbnails may be maintained on data storage 210 on client device 102 to save storage space on client device 102.

Furthermore, online content management system 106 can allow user 104 to implement the system 100 across multiple devices. For example, online content management system 106 can replicate content item data 220, feature data 222, galleries, digital content items, or other portions of system 100 across multiple devices. Thus, if user 104 adds a new digital content item, a new visual feature tag, etc. via one client device 102, online content management system 106 can send or sync the change to other client devices linked to an account of user 104.

Figure 3B:
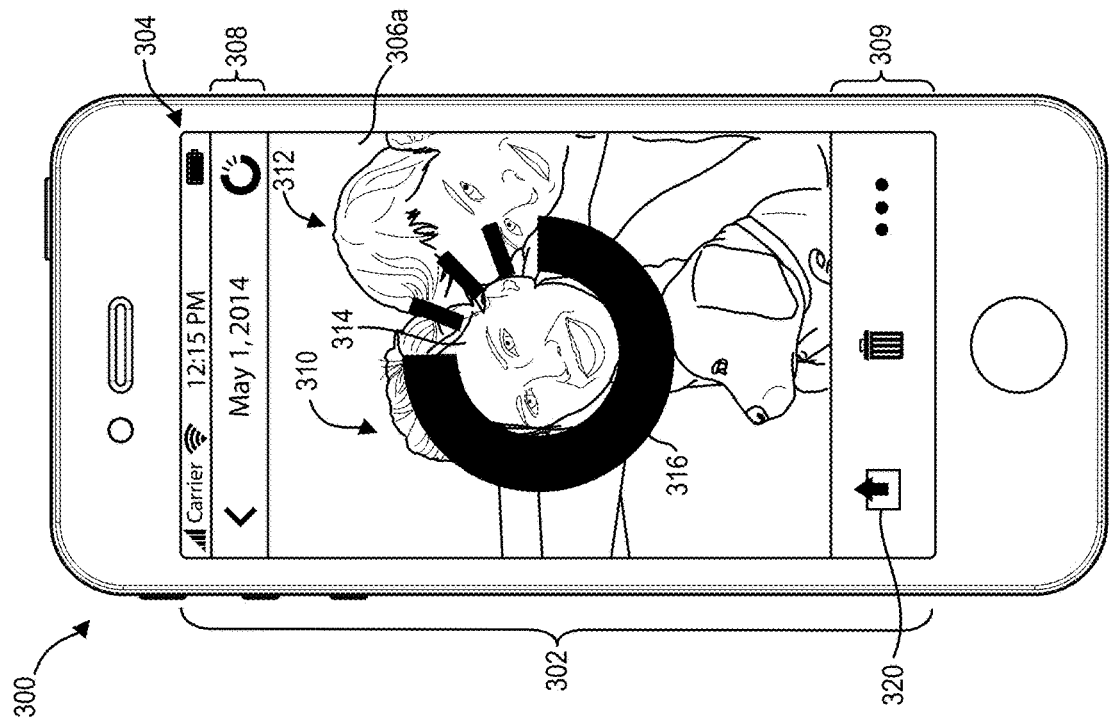
Figure 3A:
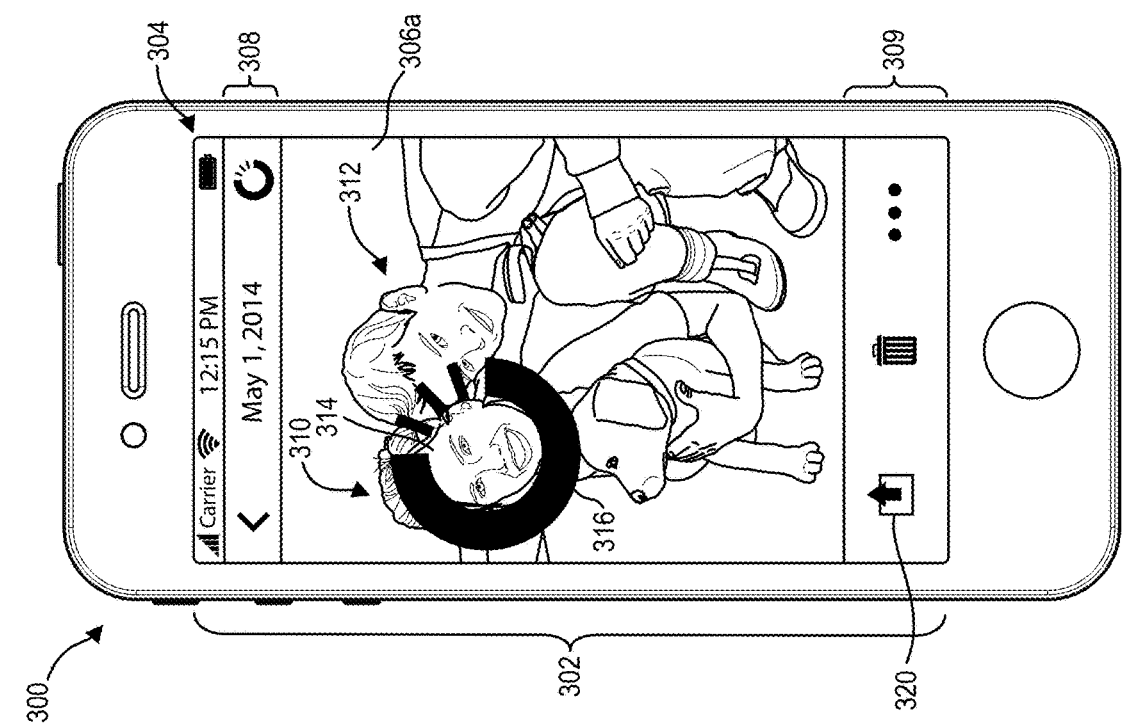

FIG. 3A illustrates an example client device 300 including graphical user interface 302 provided via touchscreen 304. In particular, FIG. 3A illustrates an example client device 300 that may implement one or more features and functionalities described above in connection with client device 102 of FIGS. 1 and 2. The client device 300 comprises a touch-screen enabled hand-held device (e.g., a device sized and configured to be held and used in a single hand of a user). As discussed below in reference to FIG. 12, other client devices (tablets, laptops, etc.) can implement the features and methods of various embodiments. Thus, the use of a touch-screen enabled hand-held device, and particularly a mobile phone, in FIGS. 3A-8C is to aid in the description of various features and methods of one or more embodiments.

Client device 300 can provide or display a presentation of one or more digital content items of a collection of digital content items via graphical user interface 302. More specifically, as illustrated in the example of FIG. 3A, graphical user interface 302 displays first image 306*a* of a collection of digital content items. Additionally, in one or more embodiments, client device 300 can provide the presentation of first image 306*a* via touchscreen 304 and receive user input with regard to first image 306*a* and other digital content items via touchscreen 304.

Content application 108 can allow a user to navigate through the collection of digital content items. For example, a user can swipe left or right on touchscreen to view the previous or next digital content item from the collection. In one or more embodiments, the digital content items are arranged in chronological order. In such embodiments, when the user swipes to the right, content application 108 can present the next later dated/time-stamped digital content item. Similarly, upon the user swiping to the left, content application 108 can present the previous earlier dated/time-stamped digital content item. In alternative embodiments, the digital content items are arranged by location or another ordering scheme.

Additionally, as illustrated in FIG. 3A, graphical user interface 302 can include first graphical icon 308 and second graphical icon 309 that provide one or more selectable options and interactive features within graphical user interface 302. In particular, first graphical icon 308 and/or second graphical icon 309 provide various selectable options and interactive features with respect to first image 306*a* and associated visual features. For example, first graphical icon 308 and/or second graphical icon 309 provide various interactive options such as, but not limited to, sharing (e.g. texting, emailing, posting), deleting, editing, categorizing, saving, hiding, rotating, aligning, or other action that client device 300 may perform with respect to first image 306*a* and one or more additional digital content items. Additionally, while FIG. 3A illustrates one embodiment in which first graphical icon 308 and second graphical icon 309 are positioned at the top and bottom of graphical user interface 302, one or more embodiments may include different configurations or positions of interactive options. For example, first and second graphical icons 308, 309 can disappear and reappear depending upon actions of user 104 or environmental or state conditions of the client application 108.

As shown in FIG. 3A, first image 306*a* may represent a photo or other type of digital content item. For example, first image 306*a* may represent a frame or thumbnail corresponding to a video file, audio file, or a high-resolution image stored locally at client device 300 or remotely at server 101 by online content management system 106. Further, as shown in FIG. 3A, first image 306*a* includes first person 310, second person 312, and a dog. In one or more embodiments, a user of client device 300 can provide input to client device 300 to select visual feature 314. For example, a user may tap touchscreen 304 on the face of first person 310 to select the face and identify the first person's face as a visual feature 314 by which the user desires to navigate their collection of digital content items.

Upon receiving user input selecting the face of first person 310 as visual feature 314 by which the user desires to navigate their collection of digital content items, the content application 108 may provide an option (e.g., via graphical user interface 302) to confirm selection of visual feature 314. In any event, in response to detecting the selection of visual feature 314, content application 108 may cause graphical user interface 302 to present a graphical element 316 indicating the selection of visual feature 314. As shown by FIG. 3A, content application 108 can cause the graphical element 316 to be overlain on the face of first person 310.

In response to the section/confirmation of visual feature 314 (i.e., face of person 310), digital content system 100 (i.e., content application 108 and/or online content management system 106) can identify all of the digital content items in the collection that include visual feature 314 (i.e., face of person 310). For example, as described above, digital content system 100 can identify a tag associated with visual feature 314 (i.e., face of person 310). Digital content system 100 can then identify all of the digital content items in the collection that have the same tag associated therewith. Alternatively if digital content system 100 has not previously recognized the face of person 310, digital content system 100 can generate a tag for the face of person 310. Digital content system 100 can then perform facial recognition on other digital content items in the collection to identify digital content items with the face of person 310. Digital content system 100 can then associate the generated tag with the digital content items having the face of person 310.

In any event, digital content system 100 can filter the digital content items in the collection generate a subset of digital content items that each include visual feature 314 (i.e., face of person 310). Content application 108 can then enable the user to navigate through the subset. For example, upon the user selecting graphical element 316, content application 108 can zoom-in on visual feature 314 (i.e., face of person 310) as shown in FIG. 3B. In particular, content application 108 can zoom or crop first image 306a such that graphical element 316 (and thus visual feature 314) is centered on touchscreen 304. As described below, centering graphical element 316 can allow the user to scrub through the subset of digital content items that each include visual feature 314.

The recognition process can determine the location, position, and/or orientation of visual feature 314. Digital content system 100 can associate this information with the tag associated with the face of person 310 or as metadata generally with first image 306a. In any event, content application 108 can use the location, position, and/or orientation of visual feature 314 to zoom in and center on visual feature 314.

Figure 3D:
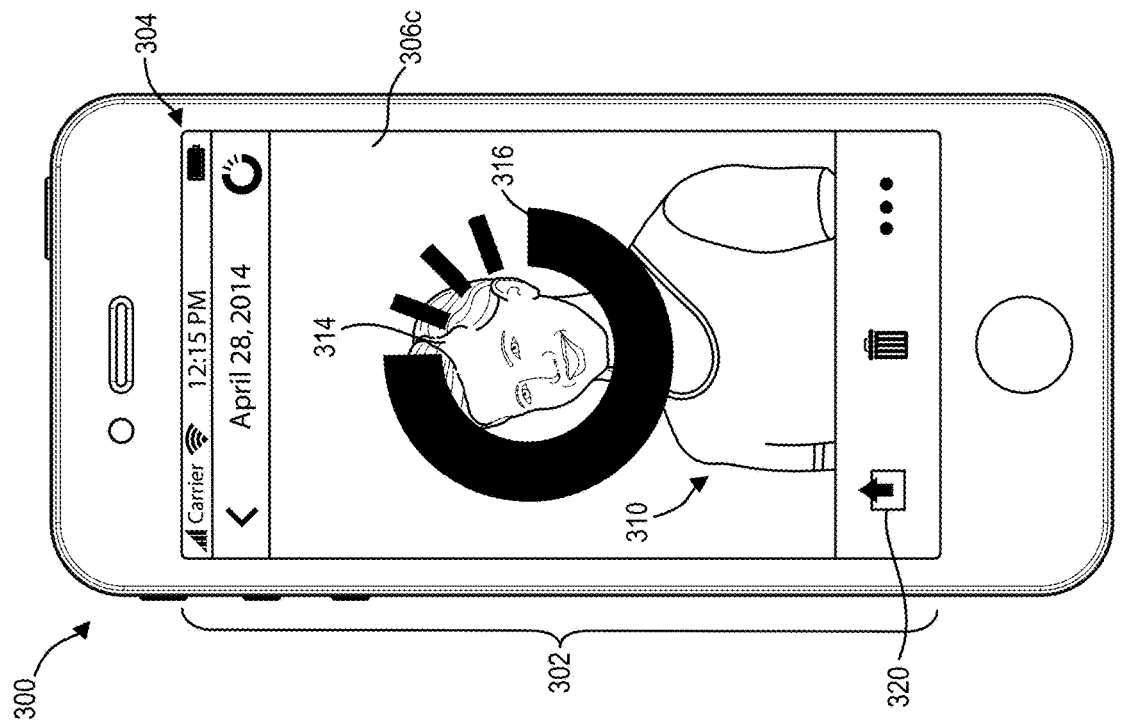
Figure 3C:
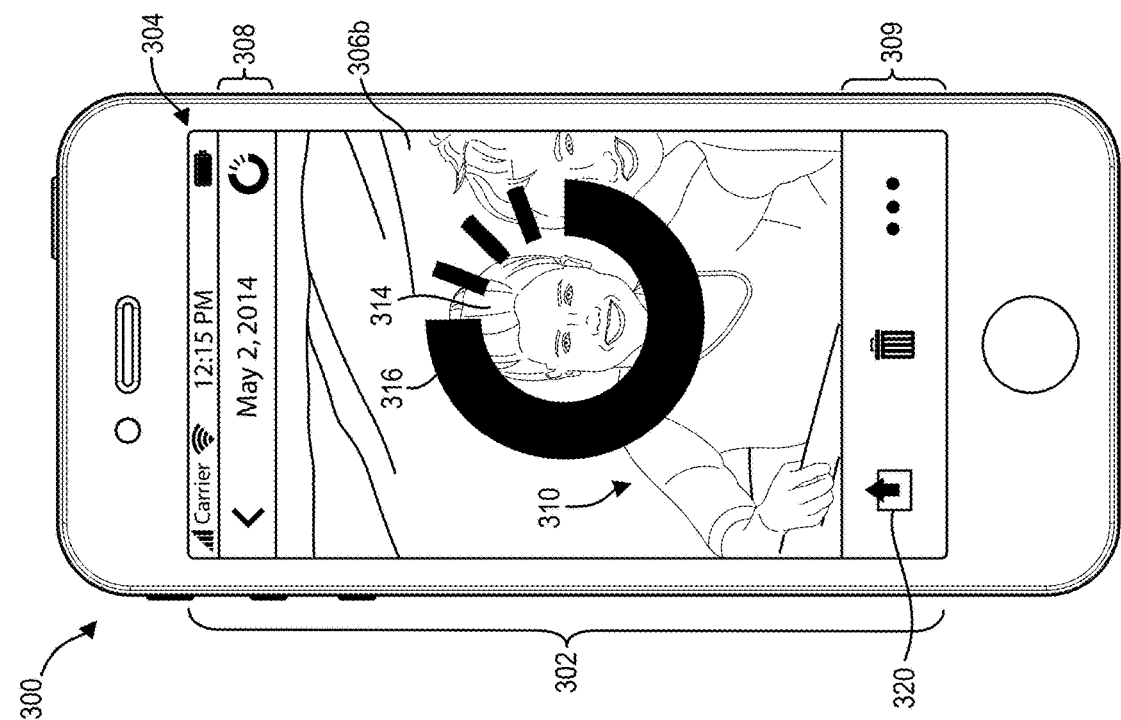

Referring still to FIG. 3B, graphical element 316 can allow the user to navigate through the subset of digital content items that each include visual feature 314 (i.e., face of person 310). For example, as a user swipes or circles around graphical element 316, content application 108 can scroll through the subset of digital content items that each include visual feature 314 (i.e., face of person 310). In particular, as the user circles around graphical element 316, content application 108 can transition from digital image 306a to the next digital content item in the collection that includes visual feature 314 (i.e., face of person 310). For example, FIG. 3C illustrates digital image 306b presented in response to the user swiping around the graphical element 316. In particular, FIG. 3C illustrates graphical user interface 302 providing second image 306b including visual feature 314 identified from first image 306a. More specifically, as illustrated in FIG. 3C, second image 306b may include first person 310 and previously identified visual feature 314 (e.g., the face of the first person 310). In particular, second image 306b may represent an identified digital content item based on an identification of visual feature 314 previously detected and associated with (e.g., tagged) second image 306b. Thus, the user can use the graphical element 316 to scrub through digital content items in the collection that include visual feature 314 (i.e., face of person 310).

In one or more embodiments the digital content items are arranged/ordered within the subset in chronological order. Thus, as a user swipes around graphical element 316, content application 108 can scroll through digital content items in the subset in chronological order. Thus, the face of person 310 displayed within graphical element 316 can appear to age as the user swipes clockwise around graphical element 316. One will appreciate in light of the disclosure herein that this aging of the face of person 310 can provide a visually pleasing way to navigate through the subset of digital content items that each include visual feature 314 (i.e., face of person 310). In contrast, the face of person 310 displayed within graphical element 316 can appear to become younger as the user swipes counter-clockwise around graphical element 316. For example, FIG. 3D illustrates digital image 306c that the content application 108 displays upon the user scrolling counter-clockwise around graphical element 316 when digital image 306a is displayed. More specifically, as illustrated in FIG. 3D, third image 306c may include first person 310 and previously identified visual feature 314 (e.g., first person's face) of first person 310. In particular, third image 306c of FIG. 3D may represent another identified digital content item that has previously been associated with (e.g., tagged) identified visual feature 314 previously detected within third image 306c.

FIGS. 3A-3D illustrate one example of identifying various digital content items that each include an identified visual feature and providing access via graphical user interface 302 to each of the identified digital content items. For example, client device 300 may display first image 306a on graphical interface. Further, a user may interact with first image 306a via touchscreen 304 and select (e.g., using a touch gesture) visual feature 314 that comprises a face of first person 310 displayed in first image 306a. In response, client device 300 may identify second image 306b and third image 306c based on a determination that each of images 306b-c include identified visual feature 314. Additionally, in one or more embodiments, content application 108 may provide a slideshow, scrub through faces, or otherwise present each of first image 306a, second image 306b, third image 306c, and any number of additional images that include visual feature 314. In particular, user 104 can slide a finger or other input object around graphical element 316. As user input circles graphical element 316, gallery manager 218 can transition from displaying first image 306a including selected visual feature 314 to displaying second image 306b including selected visual feature 314 and then to displaying third image 306c including selected visual feature 314. Thus, graphical element 316 can allow user 104 to navigate a subset of digital content items including selected visual feature 314 (e.g., the face of first person 310). Moreover, while FIGS. 3A-3D show graphical element 316 as a circular element, it is appreciated that graphical element 316 can have a variety of shapes and orientations. For example, in one or more embodiments, graphical element 316 is a linear element and enables user 104 to navigate a subset of digital content items including selected visual feature 314 by sliding a finger or other input in a first or second direction along graphical element 316.

One will appreciate in light of the disclosure herein that the ability provided by system 100 to select a visual feature and then navigate through other digital content items having the selected visual feature can provide an intuitive and powerful way for a user to search, filter, or browse a collection of digital content items. For example, if the user desires to find the "best" picture of person 310, the user can select the face of person 310 as a visual feature upon which system 100 can filter a collection of digital content items. In this manner, the user an easily and quickly browse all photos in their collection that includes the face of person 310.

FIGS. 3B-3D illustrate an embodiment in which the content application 108 provides a zoomed in or centered portion of digital content items during scrubbing. This allows a user to continually scroll around graphical element 316 as the underlying digital content items changes because graphical element 316 says in the same position on touch screen 304. When a user navigates to a desired digital content item, the user can tap on a portion of the touch screen 304 other than graphical element 316. In response, content application 108 can present a zoomed out or complete view of the respective digital content item. For example, when the zoomed version of digital image 306a is displayed (as shown by FIG. 3B), the user can tap on the zoomed version of digital image 306a. In response, content application 108 can provide the full version of first digital image 306a (as shown by FIG. 3A). This can allow the user to both view the entire first digital image 306a, which can allow the user to deselect visual feature 314, select another visual feature, or otherwise navigate the collection of digital images.

Figure 3F:
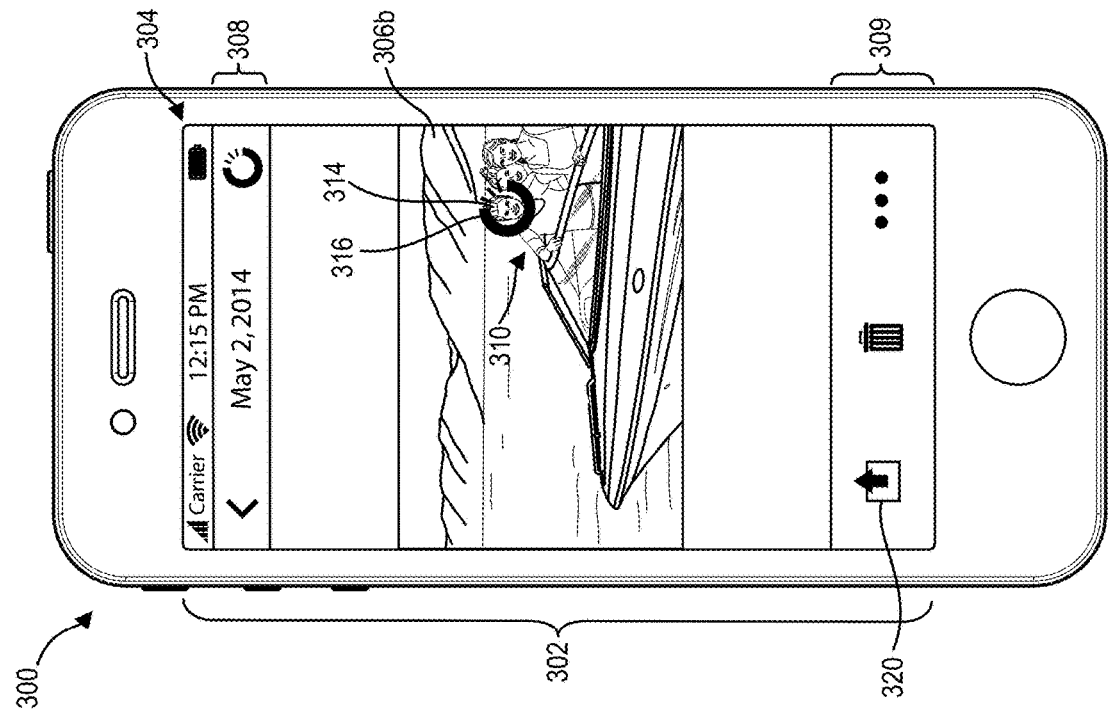
Figure 3E:
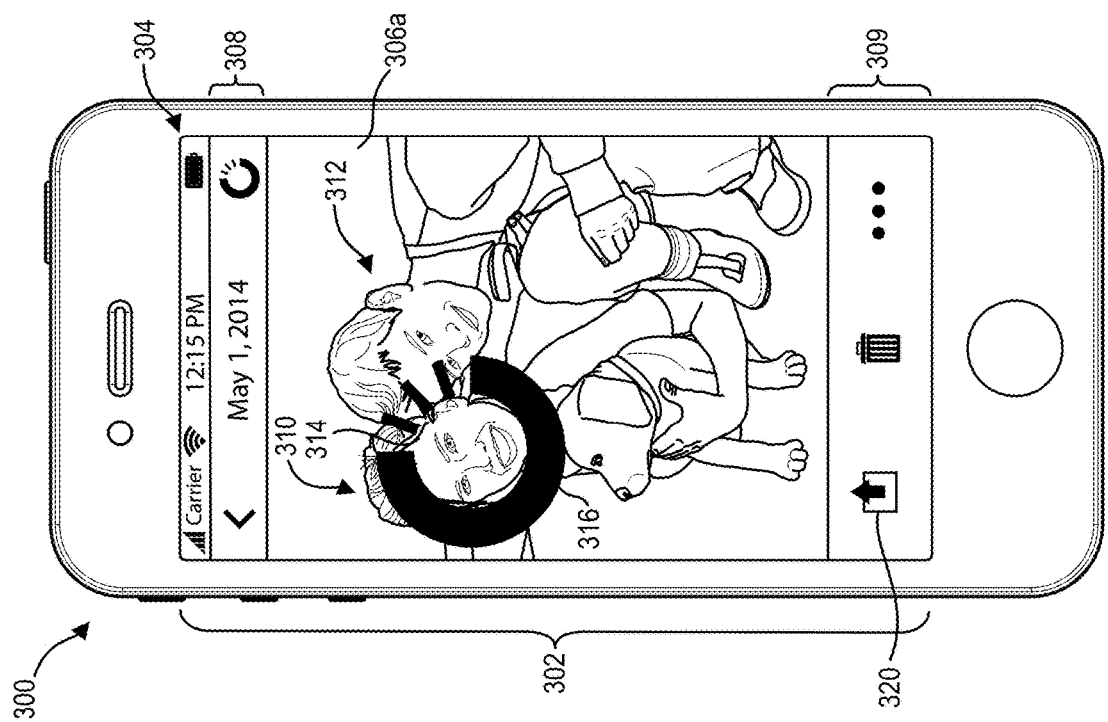

One will appreciate in light of the disclosure herein that content application 108 can provide various ways or methods of browsing or navigating a collection of digital content items. For example, rather than providing a zoomed version of digital content items to allow graphical element 316 to remain centered relative to touchscreen 304, content application 108 can provide a full version of digital content items. FIGS. 3E-3G illustrate such an embodiment. In particular, FIGS. 3E-3G show that graphical element 316 can encircle selected visual feature 314 as described above. Rather than scrolling through digital content items in response to user input about graphical element 316, content application 108 can scroll through the subset of digital content items having visual feature 314 in response to swipe gestures to the right or left or other user input. Thus, content application can display un-zoomed versions of digital images 306a-306c while the user browses the subset of the collection.

As shown in FIGS. 3A-3G, graphical user interface 302 may further include any number of interactive features that enable a user to perform various functions with respect to the identified digital content items. For example, where system 100 has identified each of the digital images 306a-c, client device 300 may store the identified images in a folder accessible to client device 300. Additionally, as client device 300 receives additional photos and detects and associates visual features within those photos, content application 108 may add subsequent photos that include the identified visual feature 314 to the folder without performing an additional search or receiving additional user input. Thus, a user may enable gradually storing digital content items as they are captured, downloaded, or otherwise received to a folder based on one or more visual features associated with received digital content. In still further embodiments, when a user swipes up on a digital content item displayed on touchscreen 304, content application 108 can add the digital content item to a folder. This can allow a user to browse a subset of digital content items having a visual feature and then add select digital content items to a folder for later viewing, printing, sharing, etc.

In addition to storing photos as they are received, one or more embodiments of content application 108 may enable a user to confirm correct placement of the photos within the folder. For example, where content application 108 or other system performs facial recognition on a photo and identifies a face, content application 108 may provisionally store the photo within a folder that includes photos that also include the identified face. The user may view the photos of the folder at any time and confirm or deny the accuracy of the identified face and storage of the photo within the folder. Thus, if the photo is incorrectly stored within the folder, the user may easily remove the photo at any time. Similarly, during browsing of a subset of digital content items identified to include visual feature 314, if a digital content item is surfaced that is incorrectly is identified as including visual feature 314, the user can select an option to unassociated the digital content item with visual feature 314.

Additionally, content application 108 may enable one or more interactive features with respect to an identified group or subset of digital content items that include identified visual feature 314. For example, upon identifying each photo within a collection of photos that include a face of first person 310, the user may select a share icon or other icon (e.g., share icon 320) and cause client device 300 to upload, post, transmit, or otherwise share each of the identified photos with one or more people. Additionally, content application 108 may enable one or more interactive features with respect to individual digital content items within the identified group or subset.

Additionally, in one or more embodiments, content application 108 may enable one or more interactive features with respect to scrubbing, browsing, or otherwise navigating an identified group or subset of digital content items. For example, content application 108 may facilitate swiping through each identified digital content item in response to receiving a swiping gesture across touchscreen 304 of client device 300 or in response to a touch scrolling around graphical element 316. In particular, as shown in FIGS. 3B-3D, a user may interact with graphical element 316 to scrub through or otherwise navigate the identified digital content items. For example, graphical element 316 may function as a scroll wheel or other scrolling tool. Further, client device 300 may enable a user to interact with graphical element 316 by rotating the user's finger around a portion (e.g., perimeter) of graphical element 316 and scroll through the identified digital content items. In one or more embodiments, the granularity or sensitivity of the scrolling function may depend on a number of identified digital content items. Alternatively, the granularity or sensitivity of the scrolling function may depend on one or more user settings. Additionally, in one or more embodiments, graphical user interface 302 may include a horizontal or vertical scroll bar with which a user may interact and scroll through the identified digital content items.

Figure 4B:
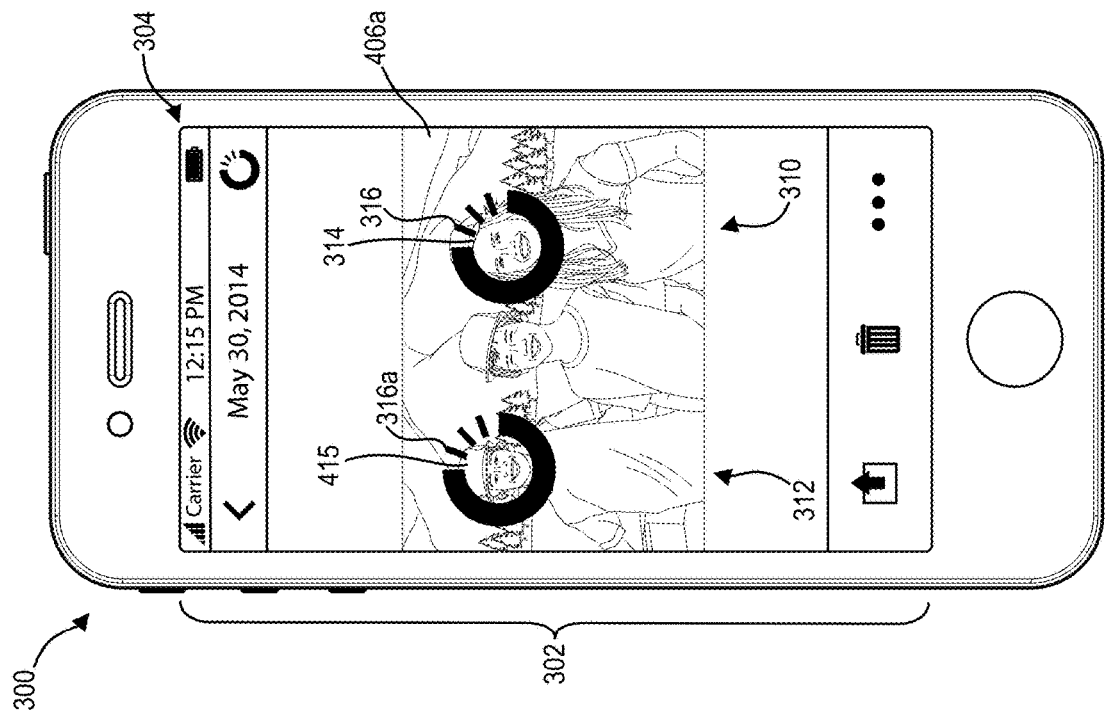
FIGS. 4A-4B illustrate graphical user interfaces showing a search for content items having multiple selected visual features in accordance with one or more embodiments.
Figure 4A:
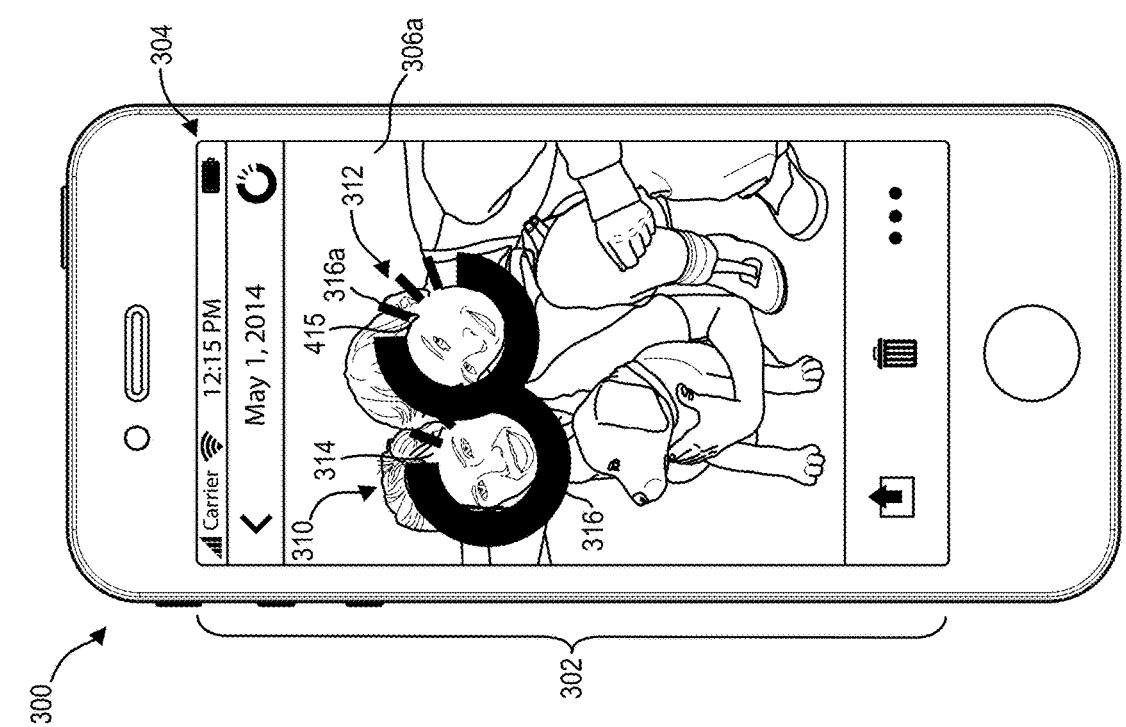

In accordance with one or more embodiments, system 100 may further identify multiple visual features and efficiently search and/or navigate a collection of digital content items based on multiple visual features. For example, as shown in FIG. 4A, client device 300 may provide a presentation of first image 306a representing a photo or other digital content item. As discussed above, first image 306a may include first person 310, second person 312, and a dog. Furthermore, content application 108 may identify one or more user inputs identifying first visual feature 314 (e.g., the face of person 310). In response to which, content application 108 can identify a first subset of digital content items in the collection of the user having visual feature 314 as described above.

At this point a user can navigate the first subset of digital content items. Alternatively or additionally, the user can select a second visual feature 415 (e.g., the face of person 312). In response to the selection of second visual feature, content application 108 can place a graphical element 316a about visual feature 415 and identify digital content items in the first subset that include the second visual feature 415. Thus, content application 108 can identify a second subset of digital content items from the collection that include both visual feature 314 and visual feature 415.

Upon the user swiping or a touch scrolling around one of graphical elements 316, 316b, content application 108 can scroll through the digital content items of the second subset of digital content items that include both visual feature 314 and visual feature 415. For example, in response to identifying that the section of both first visual feature 314 and second visual feature 415, content application 108 may identify and provide access to second image 406a illustrated in FIG. 4B. In particular, as illustrated in FIG. 4B, second image 406a may include the face of first person 310 corresponding to first visual feature 314 and the face of second person 312 corresponding to second visual feature 415. Content application 108 may further provide access (e.g., display) to any number of additional images that include both first visual feature 314 and second visual feature 415.

Moreover, while not illustrated in FIGS. 4A and 4B, a user may further select one or more additional visual features. For example, a user may select the face of the third person within second image 406a by tapping touchscreen 304 of client device 300 on the face of the third person. In response, content application 108 may identify a profile or other identifier associated with the face of the third person. Content application 108 may further identify one or more images within a collection of images that includes each of first visual feature 314, second visual feature 415, and the selected third visual feature. For example, client device 300 may analyze a subset of already identified images that include first visual feature 314 and second visual feature 415 and identify any images within the subset that also include the third visual feature.

In one or more embodiments, client device 300 may receive inputs identifying both first visual feature 314 and second visual feature 415 while displaying the same digital content item on client device 300 (e.g., without performing an incremental search). For example, client device 300 may receive both a first user input identifying first visual feature 314 and a second user input identifying second visual feature 415 while displaying first image 306a on graphical user interface 302. More specifically, while displaying first image 306a, a user may tap touchscreen 304 on the face of first person 310 to identify first visual feature 314 and additionally tap touchscreen 304 on the face of second person 312 to identify second visual feature 415. Alternatively, the user can perform a tap with two fingers to select both visual feature 314 and visual feature 415 at the same time. In response, as mentioned above, content application 108 may cause graphical elements 316, 316a indicating selection of the visual features to be displayed on graphical user interface 302 over each of the selected faces. Further, in response to the selected visual features, content application 108 may identify and provide access (e.g., present a slideshow, scrub through images) of each image within a collection of images that include both first visual feature 314 and second visual feature 415.

Alternatively, in one or more embodiments, content application 108 may receive user inputs identifying separate visual features as part of an incremental search. For example, client device 300 may display an image that includes first person 310 and receive a user input identifying first visual feature 314 (e.g., face of first person 310) in conjunction with displaying the image. Upon receiving a first user input identifying first visual feature 314, content application 108 may perform a search and identify images of a collection that include first visual feature 314 and display one or more of the identified images. For example, as illustrated in FIG. 4A, content application 108 can display first image 306a based on a selection of first visual feature 314. Additionally, client device 300 may receive a second user input identifying second visual feature 415 and perform a second search and identify each image of the collection that includes both first visual feature 314 and second visual feature 415. As described above, client device 300 may further perform additional searches in response to receiving additional user inputs identifying additional visual features. As such, content application 108 can allow a user to perform a multi-step filtering process to find more and more specific digital content items.

In a similar example that involves identifying and providing access to digital content items that include multiple visual features, content application 108 may provide access to a collection of photos that include various photos of a user's family including a spouse and two children including a son and a daughter. As described above, content application 108 may display a first photo that includes the son. The user may select a face (e.g., a first visual feature) of the son and provide further input causing content application 108 to identify each photo within the collection and generate a first gallery of photos that includes only those photos having the face of the son. Content application 108 may present one or more of the identified photos to the user including a second photo that includes both the son and the daughter. The user may select a second face (e.g., a second visual feature) of the daughter and provide further input, in response to which, content application 108 can identify each photo within the collection of photos (e.g., within the first gallery) that includes both the son and the daughter. Content application 108 may further generate a second gallery of photos that includes only those photos having the faces of the son and the daughter.

In the same example, the user may further scan through photos including both the son and daughter and identify a photo including the user's spouse and/or the user. Within the same photo or different photos, the user may further select a face of the user as well as the face of the spouse and identify each photo within the collection of photos stored on client device 300 that include each of the son, daughter, user, and spouse. Accordingly, in one or more embodiments, a user may perform incremental searches to conveniently identify and access photos that include any number of selected visual features (e.g., faces of each member of the user's family).

In addition to allowing a user to filter down into a collection of digital content items, content application 108 can allow a user to explore or browse various different visual features. For example, the user can select a first visual feature. In response to which, content application 108 can present a first gallery of digital content items including the first visual feature. While browsing the first gallery, the user may see a second visual feature. The user can select the second visual feature and deselect the first visual feature. The content application 108 can then present the user with a gallery of digital content items that include the second visual feature irrespective of the inclusion or exclusion of the first visual feature. As such, content application 108 can allow a user to browse or explore digital content items based on visual features using any number of paths, filtering steps, etc.

In addition to selecting faces and identifying digital content items based on selected faces, one or more embodiments may include selecting various types of objects and identifying digital content items that include corresponding objects or object types. In particular, as illustrated in FIG. 5A, content application 108 may display first image 506a on graphical user interface 302 that includes a mountain bike. Additionally, as shown in FIG. 5A, graphical user interface 302 may include graphical element 316c indicating selection of the mountain bike as visual feature 520. For example, graphical element 316c may surround selected visual feature 520. Moreover, it is appreciated that one or more features described herein with regard to selecting objects as visual feature may also apply to selection of faces and other visual features described herein.

In one or more embodiments, content application 108 may receive a user input identifying an object type corresponding to visual feature 520. For example, a user may tap touchscreen 304 of client device 300 on a region of first image 506a that includes visual feature 520. In response, content application 108 may identify selected visual feature 520 by identifying a pre-tagged object at the location the user tapped the touchscreen 304. In another example, a user may use a click and drag gesture to outline region (e.g., a box) within first image 506a that includes visual feature 520. In response, content application 108 may identify visual feature 520 by identifying a pre-tagged object within the outlined region defined by the user input. In one or more embodiments, content application 108 may identify multiple objects near a selected location or within a region and provide an option for a user to confirm selection of visual feature 520.

In response to identifying a selection an object as visual feature 520, content application 108 may identify each digital content item within a collection of digital content items that include the object selected as identified visual feature 520. For example, where a user has selected a particular bicycle within a photo, content application 108 may identify each photo within a collection of photos that includes the same bicycle. Additionally, content application 108 may generate a gallery of photos including the identified bicycle.

In one or more embodiments, rather than identifying only those digital content items that include the exact same object, content application 108 may identify digital content items including objects of the same type of object selected by user. For example, where selected visual feature 520 is a mountain bike, content application 108 may recognize a selection of an object type corresponding to a more general category of "bicycle" and identify any digital content item that includes any type of bicycle. Thus, instead of limiting a selection to a specific object, content application 108 may receive a user input indicating a type of object and identify each digital content item that includes an object of the selected object type. Additionally, content application 108 may provide access to each identified digital content item including an object of the selected object type.

Figure 5B:
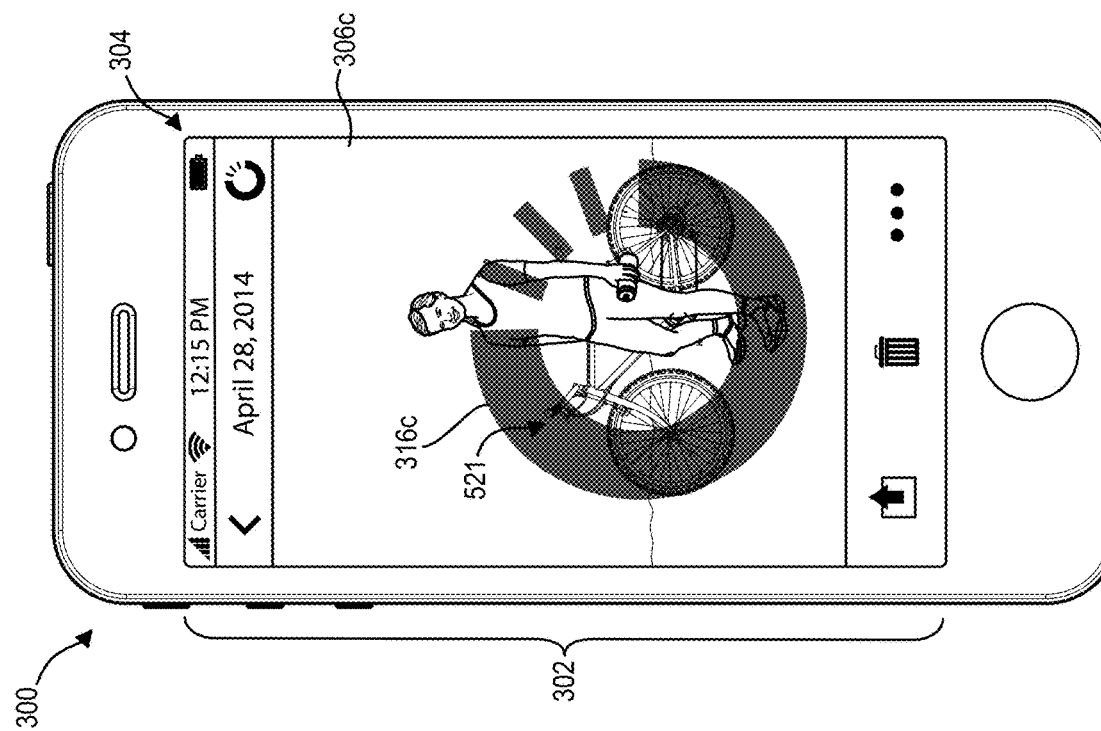
FIGS. 5A-5B illustrate graphical user interfaces showing a search for content items having a selected visual feature in accordance with one or more embodiments.
Figure 5A:
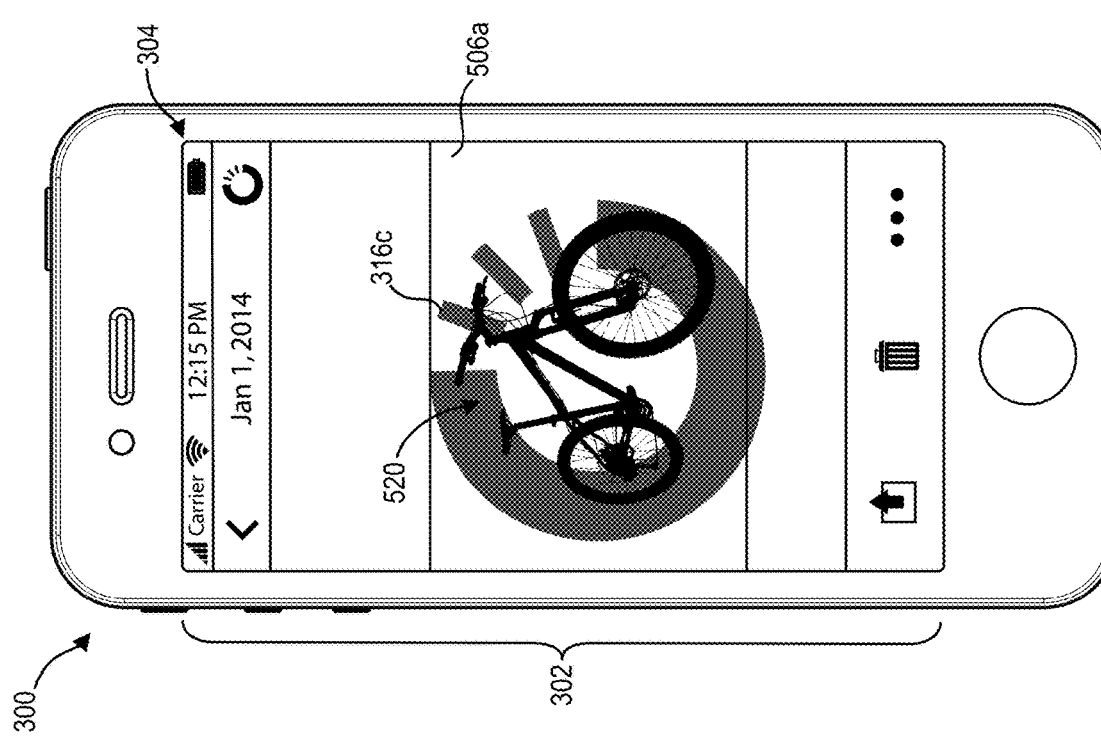

For example, as shown in FIGS. 5A-5B, content application 108 may receive a user input identifying a selection of visual feature 520 and recognize a selection of a particular object type. For example, where visual feature 520 is a mountain bike, content application 108 may recognize a user selection of visual feature 520 as a selection of a more general "bicycle" type of object and identify any photos within a collection of photos including any type of bicycle, including, for example, mountain bikes, road bikes, or other types of bicycles. Content application 108 may further provide access to each identified digital content item that includes any type of bicycle.

FIGS. 5A-5B further illustrate one example of selecting an object type and providing access to one or more images including objects of the selected object type. For example, as shown in FIG. 5A, client device 300 may receive a user input identifying visual feature 520 corresponding to a bicycle within first image 506a. In one or more embodiments, content application 108 may recognize selection of visual feature 520 as a selection of a general type of "bicycle" and identify any images within a collection of images that include a bicycle and provide access to each of the identified images. For example, content application 108 may identify and provide access to second image 306c including object 521 corresponding to another bicycle previously identified within second image 306c.

In one or more embodiments, content application 108 may enable a user to indicate a specific object type or category when selecting an object within a digital content item. For example, upon selecting visual feature 520, content application 108 may provide one or more options for the user to select a more general or specific object type corresponding to selected visual feature 520. For instance, where selected visual feature 520 is a red mountain bike, content application 108 may provide multiple options of categories or object types of varying levels of specificity that each include the selected mountain bike via graphical user interface 302. As an example, in response to receiving a user input identifying a red mountain bike, content application 108 may provide a listing, menu, or other interface including options of object types such as, for example, mountain bike, red bicycles, all bicycles, all vehicles, or other object type or category that would include the selected red mountain bike.

In one or more embodiments, rather than browsing through the photos to identify a bicycle or other type of object, user may identify a bicycle by entering a search query. For example, the user may enter "bicycle" within a query window and cause content application 108 to search the collection of photos to identify any tags or previously detected objects that correspond to the entered search term. Content application 108 may identify each photo within the collection that has a bicycle and provide access to each of the photos to user. Alternatively, rather than searching the entire collection, content application 108 may identify a first photo that has a bicycle and provide the first photo to the user via graphical user interface 302. Further, user may select the bicycle within the identified first photo and perform a subsequent search for any additional photos that include the selected bicycle.

In another example, the user may perform a search for an object by accessing an external photo (e.g., a photo not included within the collection of photos) and identifying an object within the external photo. For example, when attempting to identify each photo within a collection that includes a bicycle, the user may open an Internet browser application and access a photo that includes a bicycle (e.g., by performing an image search). Content application 108 (or online content management system 106) may perform an object recognition process on the external photo to identify the bicycle and subsequently perform a search of the collection of photos to identify each photo that also includes a bicycle. In one or more embodiments, content application 108 may add the external photo to the collection of photos as part of the process of performing the search. Alternatively, content application 108 may discard the external photo after identifying other photos within the collection. Thus, content application 108 can allow a user to find a digital content item with a particular visual feature even when the user cannot locate an initial digital content item with the visual feature.

As an alternative to searching external digital content items and/or locating a digital content item within the collection that includes a particular object, one or more embodiments may include receiving a selection of an object from a library of common objects. For example, a user may identify one or more objects (e.g., cars, buildings, faces) or other visual features (e.g., colors, landscape, locations) that are known to exist within the collection or are otherwise common to various collections of digital content items. Thus, even where a presently displayed image does not necessarily include a specific visual feature, content application 108 may nonetheless receive a user input identifying one or more visual features associated with various images within a collection.

Referring again to FIGS. 5A and 5B, when the user provides a touch gesture that circles graphical element 316c, content application 108 can scroll through digital content items including objects of the type of object of visual feature 520 (e.g., bicycles). In one or more embodiments, content application 108 may order the digital content items in the subset of digital content items including objects of the type of object of visual feature 520 in chronological order. Thus, content application 108 will show newer digital content items as the user scrolls clockwise and older digital content items as the user scrolls counter-clockwise around graphical element 316c.

In alternative embodiments, content application 108 can order the digital content items in the subset of digital content items including objects of the type of object of visual feature 520 in accordance with a recognition confidence score. For example, when performing object or facial recognition, system 100 can assign each "recognized" object or face a confidence score that indicates how likely the recognized object is the selected visual feature. Thus, content application 108 can show digital content items with lesser confidence scores as the user scrolls clockwise and digital content items with lesser confidence scores as the user scrolls counter-clockwise around graphical element 316c (or vice-versa).

Figure 6:
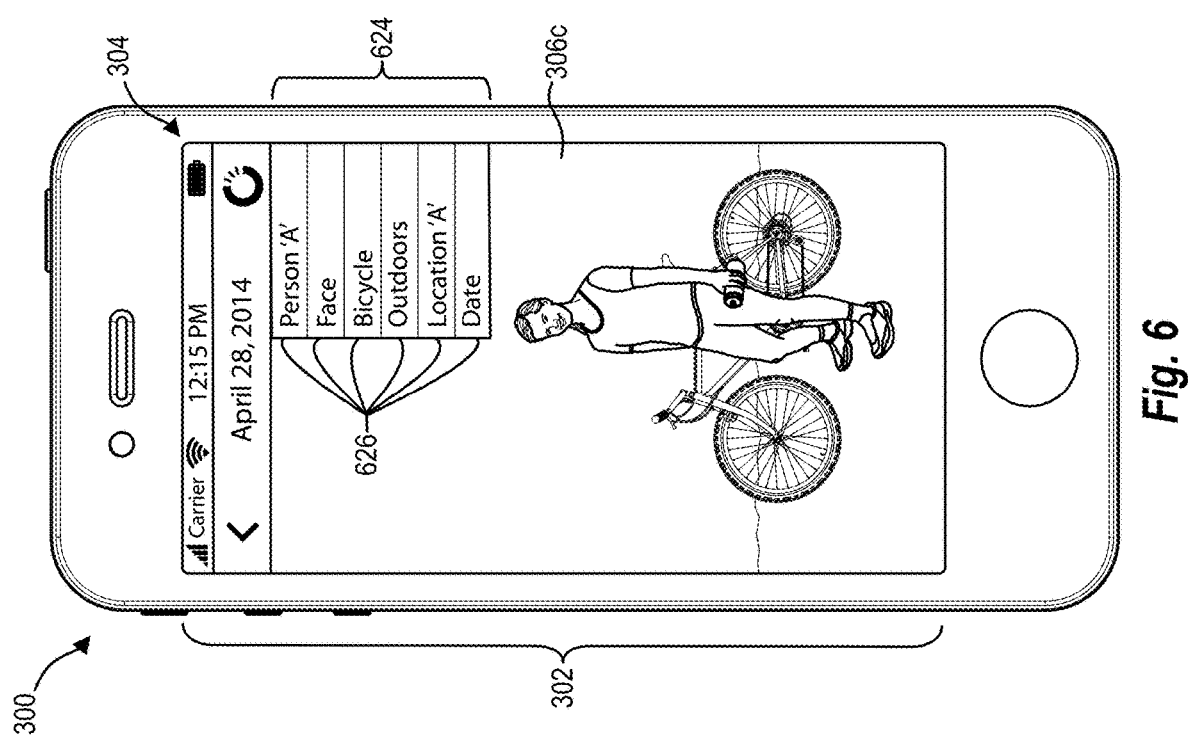
FIG. 6 illustrates an example of a graphical user interface that allows a user to select visual features of a digital content item in accordance with one or more embodiments.

Additionally, as illustrated in FIG. 6, content application 108 may provide listing 624 of selectable options 626 corresponding to one or more visual features corresponding to an object, type of object, face, characteristic, or other visual feature that has been identified for image 306c. For example, as described above in connection with FIG. 2, content application 108 and/or online content management system 106 may perform facial recognition, object recognition, and/or additional analysis on digital content items or metadata associated with digital content items to detect and associate any number of visual features associated with each digital content item. Additionally, content application 108 can provide listing 624 including selectable options 626 corresponding to each of the visual features previously associated with digital image 306c.

For example, as shown in FIG. 6, selectable options 626 may include an identified person A referring to a person previously identified within image 306c. Additionally, selectable options 626 may include one or more objects or types of objects including a face (e.g., referring to a generic face) and a bicycle. For example, in this instance, if a user were to select the face option, content application 108 may identify photos that include any generic face and not necessarily the face of person identified within the presently displayed digital image. Further, selectable options 626 may include one or more characteristics such as a photo being taken outdoors at a particular location (e.g., Location 'A'), or on a particular date. In one or more embodiments, content application 108 may receive a user selection of one or more selectable options 626 and identify those digital content items within a collection that include the one or more selected visual features from the selectable options. Thus, in addition to or alternative to selecting visual features directly from a presentation of image 306c, content application 108 may enable a user to select one or more visual features from a listing, drop-down menu, or other presentation of selectable options within graphical user interface 302.

Further, in one or more embodiments, content application 108 may receive input identifying multiple visual features using a combination of selection methods described herein. As an example, a user may select the face of the person in the photo of FIG. 6 by touching the face on touchscreen 304. In response, content application 108 can identify any additional digital content items that include the person corresponding to the selected face. In addition, the user may select one or more of selectable options 626 indicating an additional visual feature to use in identifying other digital content items within the collection. For example, the user may select the location option to identify photos within the collection that were taken at the same location as the presently displayed photo and which include the person's identified face. As such, content application 108 may conveniently identify any photos taken at a particular event (e.g., date/time and location) and which include one or more additional identified features.

Moreover, in one or more embodiments, a user may further specify a category or additional detail with respect to a particular visual feature. For example, while not explicitly shown in FIG. 6, when selecting selectable option 626 such as location, content application 108 may further provide one or more additional categories of location for a user to specify a granularity or specificity of the selected location. For example, content application 108 may allow the user to specify a county, state, city, county, address, GPS location, a radius (e.g., photos within 1 mile of selected photo) or other type of location to further instruct content application 108 to identify photos that match a particular criteria. Additionally, in one or more embodiments, content application allows a user to select or otherwise specify a specific or personalized place such as home, work, grandma's house, Petco Park, or other location.

Additionally, content application 108 may consider multiple visual features when identifying a particular location. For example, while a GPS location or other location metadata may provide an indication of a specific address or close proximity to where a photo was taken, this information may not provide information needed to identify a specific room where a photo was taken. As such, content application 108 may additionally consider one or more objects within a photo or information unrelated to location metadata to determine a more precise location associated with the photo. For example, where a user wants to identify each photo within a collection taken in a particular room, content application 108 (or online content management system 106) may identify one or more objects that are present within a room (e.g., painting, couch, fireplace) and associate a combination of location information (e.g., a GPS location, location metadata) and one or more detected objects with a specific location. For example, where location data indicates that a photo is taken near a user's address and also includes a painting or specific couch within the photo, content application 108 may ascertain that the photo was taken within a specific room at the user's house and provide a feature whereby the user may identify the specific room of the house and search and identify photos within a collection taken within that room.

Figure 7B:
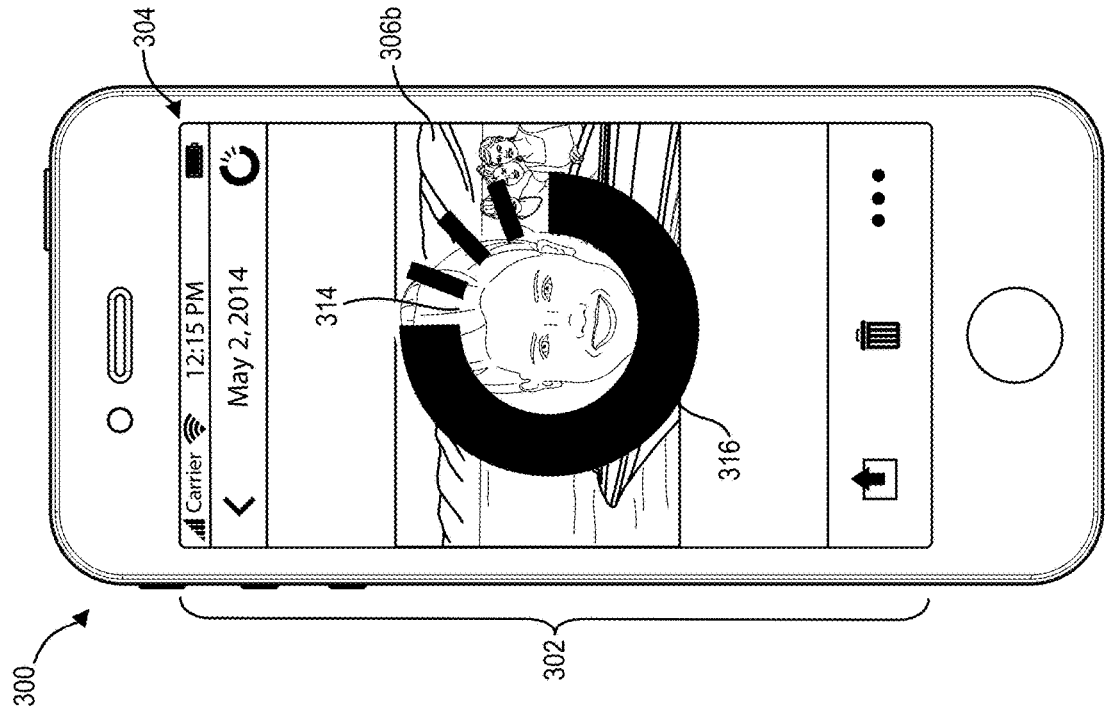
FIGS. 7A-7B illustrate additional graphical user interfaces showing a search for content items having a selected visual feature in accordance with one or more embodiments.

In one or more embodiments, a user may receive access to digital content items in a variety of ways. For example, as described above, content application 108 may provide a slideshow or other presentation of each identified digital content item that include one or more identified visual features. Additionally, as illustrated in FIGS. 7A-7B, content application 108 may provide access to identified digital content items and highlight or further emphasize the one or more selected visual features.

Figure 7A:
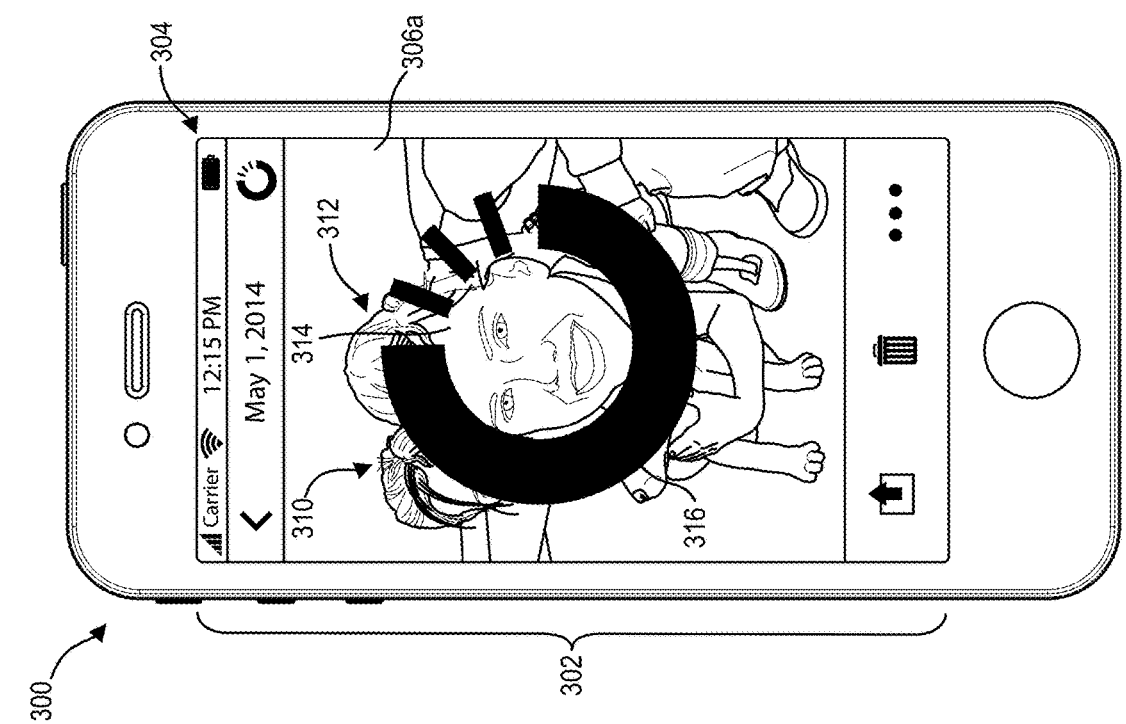

For example, as shown in FIG. 7A, content application 108 may provide first image 306a to a user via graphical user interface 302. As illustrated in FIG. 7A, first image 306a may include first person 310 and second person 312. In response to receiving a selection of first visual feature 314 corresponding to the face of first person 310, content application 108 can provide an overlay of a thumbnail or cropped portion of first image 306a that includes visual feature 314. For example, as shown in FIG. 7A, the overlay may include a zoomed in portion of first image 306a including the face of first person 310.

In one or more embodiments, content application 108 (or online content management system 106) may generate the thumbnail or cropped portion of an image upon previously detecting a visual feature within the image. Additionally, content application 108 may generate a thumbnail image for each detected visual feature within a corresponding image and store the thumbnail(s) with the corresponding image on client device 300 or on server device 101. Moreover, in one or more embodiments, the thumbnail image may include a higher resolution depiction of the visual feature than the background image displayed on client device 300. For example, the thumbnail image may include a cropped portion of an original digital content item while the background image may be a lower resolution version of the original digital content item as maintained on client device 300.

In providing the overlay of the thumbnail or cropped portion of a corresponding image, content application 108 may rotate or otherwise align a presentation of the cropped portion within graphical user interface 302. For example, because the face of first person 310 within first image 306a is tilted slightly to the left, content application 108 may optionally align the thumbnail image by rotating the thumbnail image slightly to the right. In one or more embodiments, content application 108 may align the face based on the eyes or other feature(s). Additionally, in one or more embodiments, content application 108 (or online content management system 106) may generate and align the thumbnail image upon detecting the face or other visual feature and at the same time as generating the thumbnail image. Further, in one or more embodiments, content application 108 may perform one or more additional actions on the thumbnail image including, for example, color correction, modifying a resolution of the thumbnail image, or other corrective measure.

Additionally, content application 108 may identify additional images including selected visual feature 314 corresponding to first person 310. For example, content application 108 may provide second image 306b to a user via graphical user interface 302 including identified visual feature 314. As illustrated in FIG. 7B, content application 108 may provide an overlay of a thumbnail or cropped portion of second image 306b that includes visual feature 314 corresponding to the face of first person 310 as included within second image 306b. In one or more embodiments, content application 108 may provide a similar overlay including a thumbnail or cropped portion of each identified image that includes identified visual feature 314 (e.g., face of first person 310).

Figure 8B:
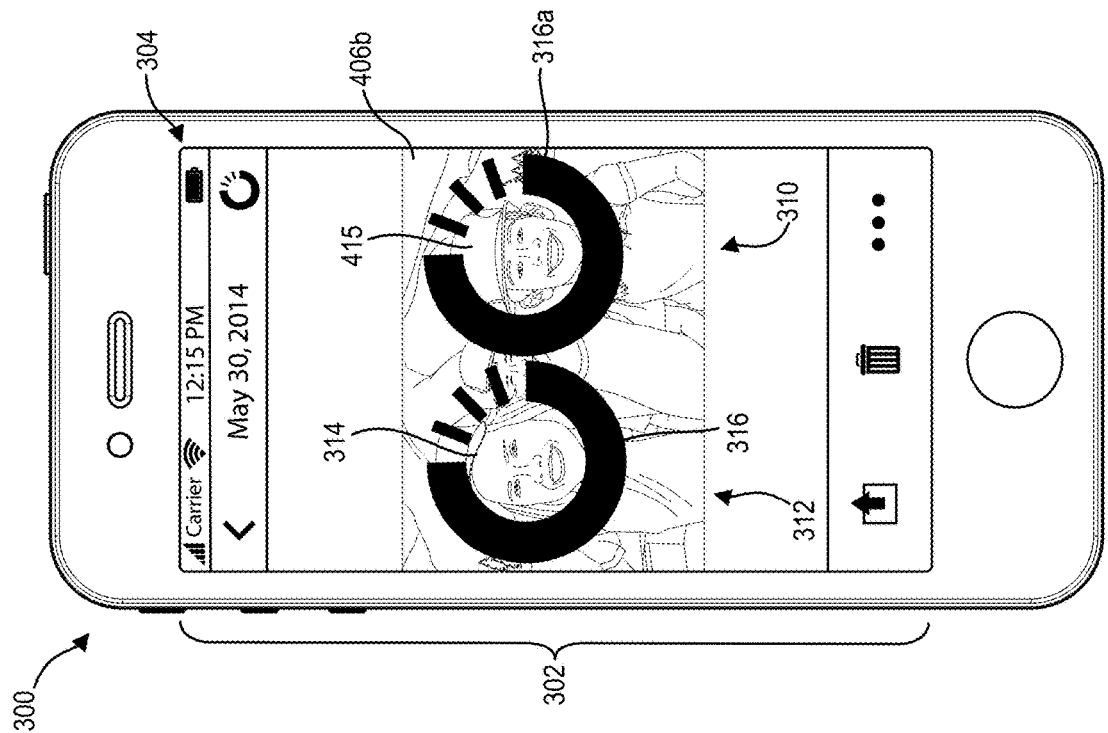
FIGS. 8A-8C illustrate additional graphical user interfaces showing a search for content items having multiple selected visual features in accordance with one or more embodiments.
Figure 8A:
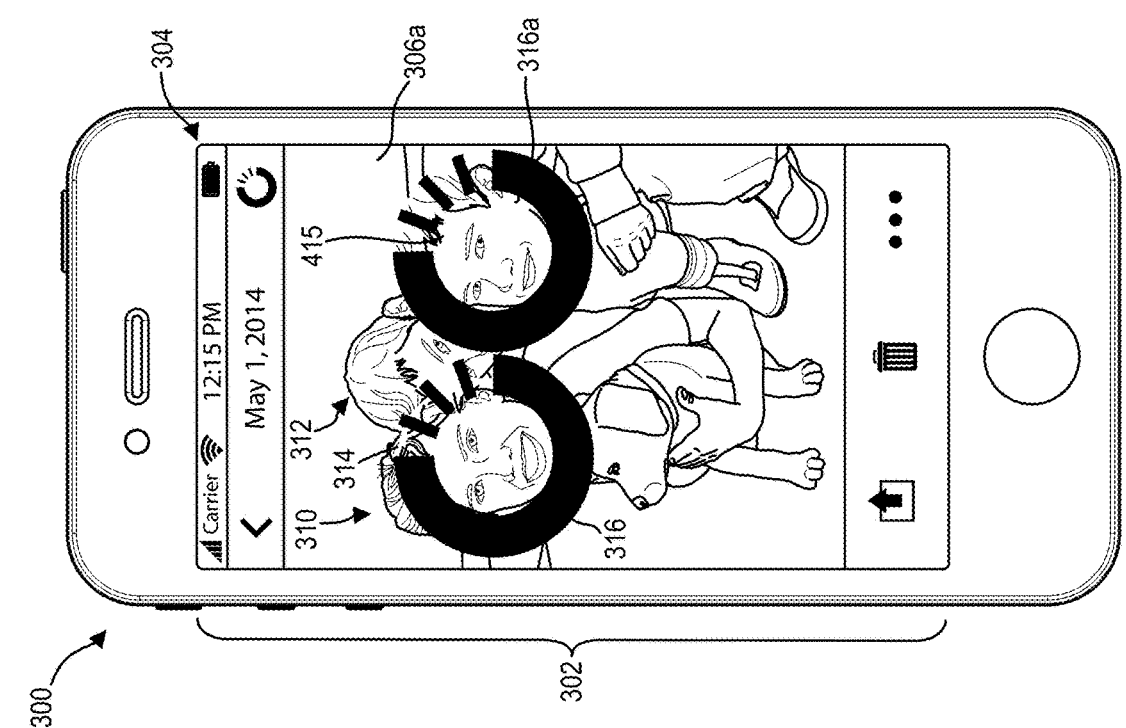
Figure 8C:
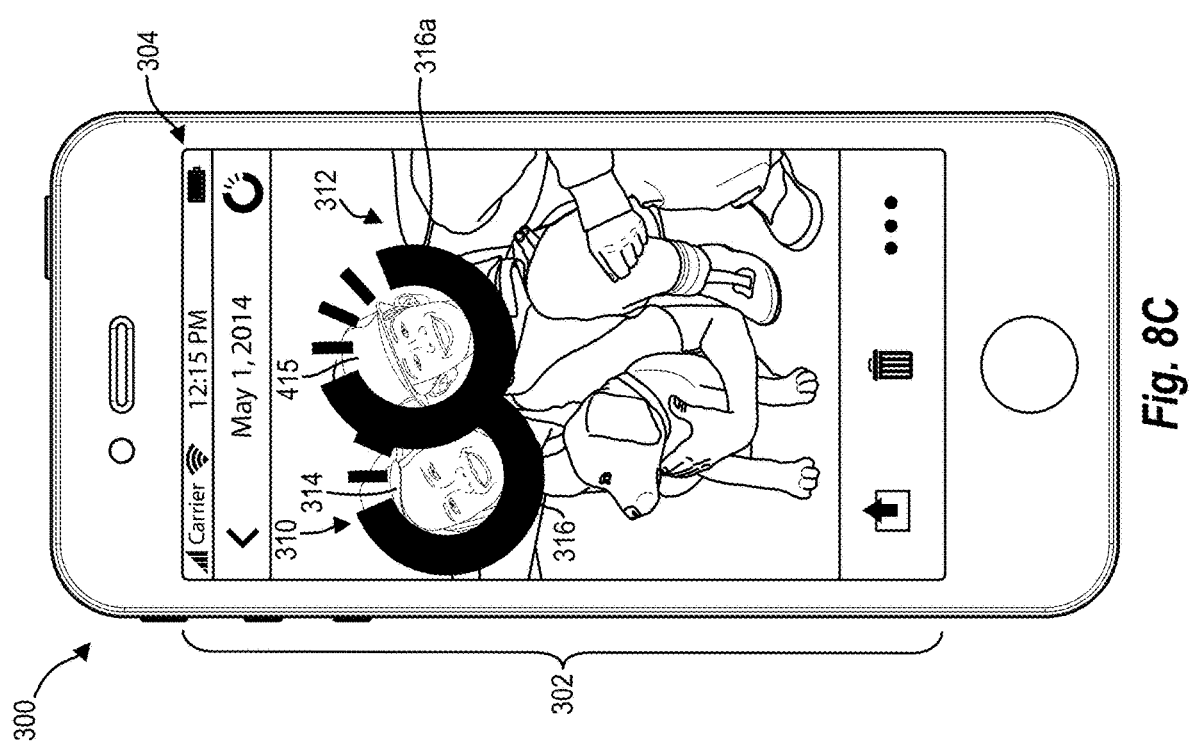

Additionally, as shown in FIGS. 8A-8C, a content application 108 including graphical user interface 302 and touchscreen 304 may provide access to one or more identified digital content items including multiple identified visual features. For example, as illustrated in FIG. 8A, content application 108 may provide graphical user interface 302 including first image 302a based on a selection of first visual feature 314 and second visual feature 415. In particular, first image 306a may include first visual feature 314 corresponding to first person 310 and second visual feature 415 corresponding to second visual feature 415. Additionally, as shown in FIG. 8A, content application 108 may provide an overlay of each identified visual feature including a thumbnail or cropped portion of first image 306a. For example, in response to receiving a selection of first visual feature 314 and second visual feature 415, content application 108 may include overlays for each identified visual feature corresponding to the image presently displayed on graphical user interface 302.

As mentioned above, content application 108 may identify additional images based on identified visual features. For example, as illustrated in FIG. 8B, content application 108 may identify and provide second image 306b via graphical user interface 302 based on identifying each of first visual feature 314 and second visual feature 415 within second image 306b. Additionally, as shown in FIG. 8B, providing access to second image 306b may include providing thumbnails or partially cropped portions of second image 306b that each include identified visual features of second image 306b. For example, content application 108 may provide a zoomed-in portion of the face of first person 310 and a zoomed-in portion of the face of second person 312 from second image 306b. Thus, in one or more embodiments, content application 108 may display thumbnails or cropped portions of each displayed image together with respective images.

Additionally, in one or more embodiments, content application 108 may display the cropped portion of a respective image using a variety of configurations. For example, where a single visual feature is selected, content application 108 may position a thumbnail of the selected visual feature at a center portion of graphical user interface 302. Additionally, where multiple features are selected, content application 108 may position each thumbnail evenly across graphical user interface 302. For example, FIGS. 8A-8B illustrated one example in which a first thumbnail corresponding to first visual feature 314 and a second thumbnail corresponding to second visual feature 415 are positioned evenly across graphical user interface 302.

Moreover, in one or more embodiments, content application 108 may provide a display of one or more cropped portions of an image in conjunction with a different image from the cropped portion(s). For example, where content application 108 has identified multiple digital content items that each include first visual feature 314 and second visual feature 415, content application 108 may scrub through cropped portions of the identified visual features without altering a background digital content item (e.g., first image 306*a*) provided in the background of graphical user interface 302. As an example, content application 108 may provide a slideshow of thumbnails that include the identified visual features without changing a background image to correspond with the presently displayed thumbnails in the foreground of graphical user interface 302.

To illustrate, FIG. 8A shows content application 108 providing first image 306*a* in the background of graphical user interface 302 while providing a first thumbnail of first visual feature 314 and a second thumbnail of second visual feature 415. As illustrated in FIG. 8A, each of the thumbnails may include cropped portions of first image 306*a*. In response to selecting the visual features and identifying one or more additional images, content application 108 may alter a presentation of thumbnails to include cropped portions of another image in conjunction with first image 306*a* displayed in the background of graphical user interface 302. For example, as shown in FIG. 8C, content application 108 may display first image 306*a* in the background of graphical user interface 302 while displaying a first thumbnail of first visual feature 314 and a second thumbnail of second visual feature 415 from a different image from first image 306*a*. For example, in the illustrated example of FIG. 8C, background image may correspond to first image 306*a* depicted in FIG. 8A and thumbnail images may correspond to cropped portions of second image 306*b* from the background image of FIG. 8B.

Additionally, as shown in FIG. 8C, rather than positioning each image evenly across graphical user interface 302, content application 108 may position each cropped portion at a similar location as corresponding visual features from the background image. For example, as shown in FIG. 8C, content application 108 may position first thumbnail including the face of first person 310 from second image 306*b* over the face of first person 310 from first image 306*a*. Similarly, content application 108 may position second thumbnail including the face of second person 312 from second image 306*b* over the face of first person 312 from first image 306*a*.

Figure 9:
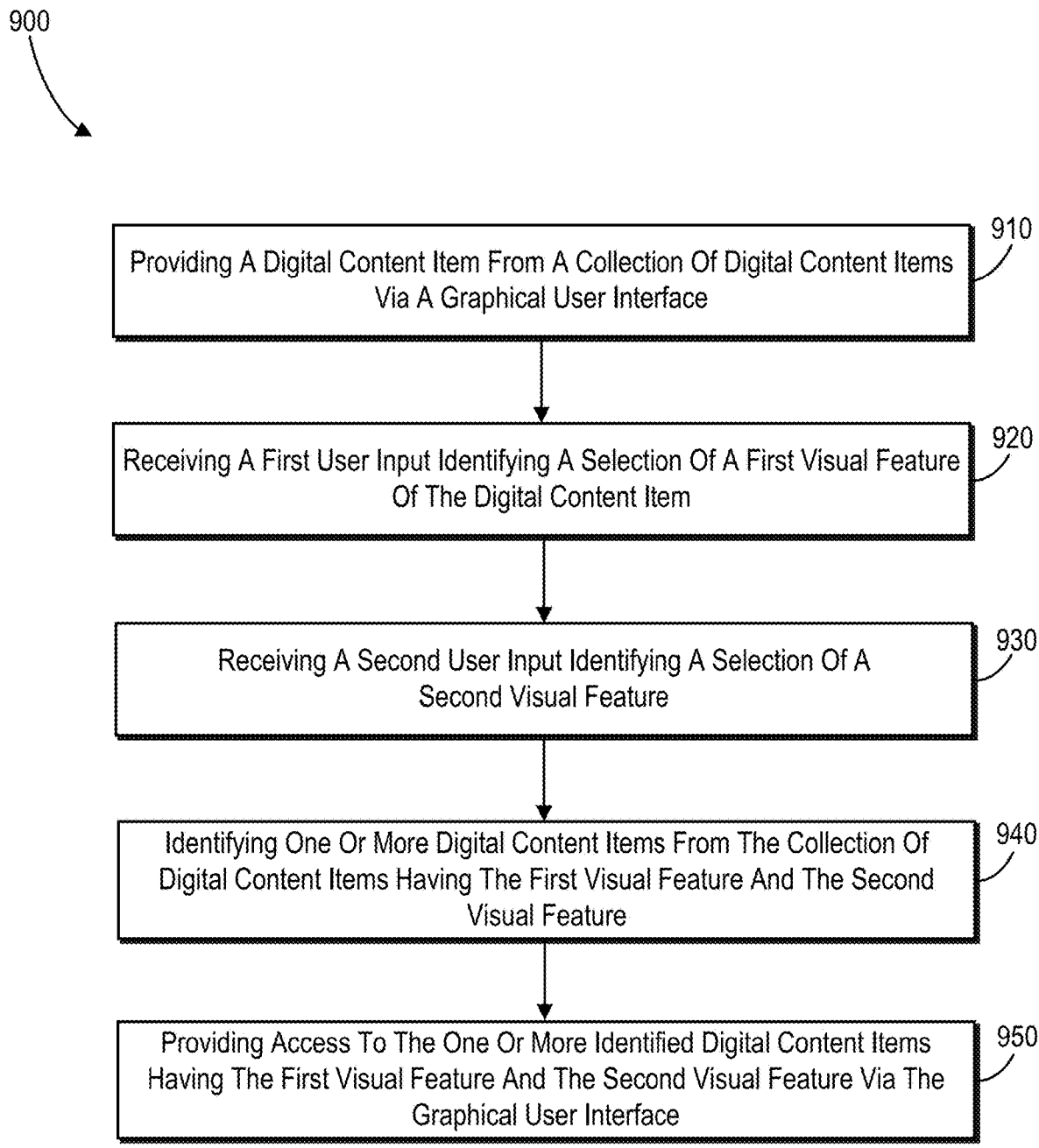
FIG. 9 illustrates a flowchart of a series of acts in a method of navigating digital content items in accordance with one or more embodiments.

FIG. 9 illustrates a flowchart of one example method 900 of identifying and providing digital content based on one or more identified visual features within the digital content. While FIG. 9 illustrates example steps according to one embodiment, other embodiments may omit, add to, reorder, and/or modify any of the steps shown in FIG. 9. One or more steps shown in FIG. 9 may be performed by any of the components illustrated in system 100 illustrated in FIG. 1. Further, one or more steps of method 900 may be performed by client device 102, 300, server device 101, or a combination of both.

Method 900 may include act 910 of providing digital content item 306*a*, 306*c*, 506*a* from a collection of digital content items. In particular, act 910 may involve providing digital content item 306*a*, 306*c*, 506*a* via graphical user interface 302 on client device 102, 300. For example, act 910 may involve providing digital image 306*a*, 306*c*, 506*a* or other type of content item such as, for example, digital images, digital video files, digital audio files, electronic documents, or other type of digital content item. In one or more embodiments, act 910 may involve providing digital image 306*a*, 306*b*, 306*c*, 506*a* representative of an original content item.

Method 900 may further include act 920 of receiving a first user input identifying a selection of first visual feature 314, of digital content item 306*a*, 306*c*, 506*a*. For example, act 920 may involve detecting, identifying, or otherwise receiving a user input with respect to touchscreen 304 or other user input device(s). Additionally, act 920 may involve detecting, identifying, or otherwise receiving one or multiple touch gestures (e.g., swipe gesture, tap gesture, pinch gesture, reverse pinch gesture). In one or more embodiments, act 920 may involve receiving the first user input identifying a region or area of digital content item 306*a*, 306*c*, 506*a* and identifying, within the region or area, a first visual feature 314 of digital content item 306*a*, 306*c*, 506*a*.

Moreover, act 920 may involve receiving the first user input identifying a selection of various types of visual features. For example, act 920 may involve receiving a user input that identifies a face of first person 312 within digital content item 306*a*, 306*c*, 506*a*. Additionally, act 920 may involve receiving a user input that identifies an object or type of object included within digital content item 306*a*, 306*c*, 506*a*. Moreover, act 920 may involve receiving a user input that identifies other visual features including, for example, faces, times, locations, landmarks, events, or various objects included within digital content item 306*a*, 306*c*, 506*a*.

Method 900 may further include act 930 of receiving a second user input identifying a selection of a second visual feature 415. Receiving the second user input may involve similar features as described above in connection with act 920. For example, act 930 may involve receiving a user input with respect to touchscreen 304 or other user input device(s). Additionally, act 930 may involve identifying a region or area of digital content item 306*a*, 306*c*, 506*a* and identifying, within the region or area, second visual feature 415. Further, act 930 may involve receiving a second user input identifying a similar type of visual feature as first visual feature 314. For example, where first visual feature 314 is a face of first person 310, act 930 may involve receiving a second user input identifying a face of second person 312. Alternatively, act 930 may involve receiving a user input identifying a different type of visual feature (e.g., object, type of object) from first visual feature 314.

In one or more embodiments, act 930 may involve receiving the second user input with respect to digital content item 306*a*, 306*c*, 506*a* corresponding to the selection of the first visual feature 314. In particular, act 930 may involve receiving a second user input identifying second visual feature 415 within the same digital content item 306*a*, 306*c*, 506*a* as the previously selected first visual feature 314. For example, method 900 may include receiving a first user input identifying first visual feature 314 of digital content item 314 and a second user input identifying second visual feature 415 of the same digital content item 314 without performing an incremental search between receiving the first and second user inputs. Alternatively, in one or more embodiments, the second user input may identify second visual feature 415 within a different digital content item 306*b*, 306*c*, 406*a* from first digital content item 306*a*, 306*c*, 506*a*. For example, in response to receiving the first user input identifying first visual feature 314, method 900 may include an act of identifying second digital content item 306*b*, 306*c*, 406*a* that includes first visual feature 314 and receiving the second user input identifying second visual feature 415 of second digital content item 306*b*, 306*c*, 406*a*.

As an example, in one or more embodiments, act 920 may involve receiving a first user input selecting a face of first person 310 in digital content item 306a, 306c, 506a. Additionally, act 930 may involve receiving a second user input selecting a face of second person 312. Acts 920 and 930 may involve receiving user inputs selecting faces of different people within the same digital content item 306a, 306c, 506a. Acts 920 and 930 may also involve receiving user inputs selecting faces of different people in different digital content items.

Method 900 may further include act 940 of identifying (e.g., by at least one processor) one or more digital content items having first visual feature 314 and second visual feature 415. In particular, act 940 may involve identifying one or more digital content items having both first visual feature 314 and second visual feature 415 from the collection of digital content items. For example, where first visual feature 314 includes a face of first person 310 and second visual feature 415 includes a face of second person 312, act 940 may involve identifying any digital content items from the collection of digital content items that include first person 310 and second person 312 corresponding to the selected faces. As another example, where first visual feature 314 includes a type of object and second visual feature 415 includes a face of a person, act 940 may involve identifying any digital content items from the collection of digital content items that include both the identified type of object and the person corresponding to the selected face.

In one or more embodiments, act 940 of identifying digital content item(s) may be performed automatically or without further user interaction with respect to graphical user interface 302 or client device 102, 300. For example, act 940 may involve identifying one or more digital content items including first visual feature 314 and/or second visual feature 415 in response to receiving the user input identifying first visual feature 314 and/or second visual feature 415 and without receiving additional user input (e.g., a command to perform a search of the collection of digital content items). In one or more embodiments, act 940 may involve identifying digital content items having an identified visual feature in response to receiving a user input identifying each visual feature. For example, act 940 may involve performing a search (e.g., an incremental search) of the collection of digital content items or a subset of the collection of digital content items in response to receiving each user input identifying each individual visual feature. Thus, in response to receiving a first user input identifying first visual feature 314, act 940 may involve identifying a first subset of digital content items that have first visual feature 314. Additionally, in response to receiving a second user input identifying second visual feature 415, act 940 may involve identifying a second subset of digital content items (e.g., a subset of the first subset) that have first visual feature 314 and/or second visual feature 415.

Additionally, in one or more embodiments, method 900 may include one or more acts that include identifying visual features within digital content items of the collection of digital content items. For example, method 900 may include an act of performing facial recognition on the collection of digital content items to identify faces of people in digital content items from the collection of digital content items. Additionally, method 900 may include an act of associating tags with the digital content items having the identified faces. In particular, method 900 may include associating digital content items with tags that indicate people that have been identified in a given digital content item. In one or more embodiments, method 900 may associate any number of tags with a particular digital content item where each of the tags identifying a face, person, object, type of object, or other visual feature identified within a respective digital content item. Additionally, with respect to identifying digital content items having first visual feature 314 and/or second visual feature 415, method 900 may involve identifying tags associated with identified visual features (e.g., selected faces) and identifying digital content items from the collection of digital content items associated with the tags. For example, act 940 of identifying digital content items may involve identifying a first tag associated with the face of first person 310 and a second tag associated with the face of second person 312 (e.g., where one or more user inputs identify the faces of first person 310 and second person 312).

Method 900 may further include act 950, which may include providing access to the one or more identified digital content items having first visual feature 314 and second visual feature 415 via graphical user interface 302. In particular, providing access to the identified digital content item(s) may include providing access to a file or database including the identified digital content items (e.g., on a client device or online content management system). Additionally, providing access to the identified digital content item(s) may include presenting a display of the identified digital content item(s) via the graphical user interface 302.

In one or more embodiments, act 950 may involve generating a subset of digital content items having first visual feature 314 and second visual feature 415 by filtering out all digital content items from the collection of digital content items lacking first visual feature 314 and/or second visual feature 415. For example, act 950 may involve generating a gallery of images that include only those images from a collection of images that have both first visual feature 314 and second visual 415 feature and presenting the gallery via graphical user interface 302 (e.g., of client device 102, 300).

In addition to providing access to the identified digital content item(s), method 900 may further generating a cropped portion of an identified digital content item that includes a visual feature. In particular, method 900 may include generating a cropped portion of corresponding digital content item 306a, 306b for each identified visual feature 314, 415. For example, method 900 may include an act of generating a first cropped portion (e.g., a zoomed-in portion) of identified digital content item 306a, 306b that includes first visual feature 314. Method 900 may further include an act of generating a second cropped portion (e.g., a zoomed-in portion) of identified digital content item 306a, 306b that includes second visual feature 415. Method 900 may include generating any number of cropped portions of any respective digital content item based on a number of visual features identified within the digital content item.

In one or more embodiments, method 900 may include providing the cropped portion(s) of a digital content item via graphical user interface 302. For example, method 900 may include providing a first cropped portion including first visual feature 314 and a second cropped portion including second visual feature 415 in conjunction with a corresponding digital content item 306a, 306b. For instance, method 900 may include providing each cropped portion corresponding to identified visual features 314, 415 over a digital content item from which the cropped portions were obtained. In one or more embodiments, method 900 may include overlaying each of the cropped portions over digital content item 306a, 306b via graphical user interface 302. Alternatively, in one or more embodiments, method 900 may include providing a cropped portion of digital content item 306b in conjunction with a different digital content item 306a from the corresponding digital content item where the cropped portion was obtained. For example, method 900 may provide the cropped portion including visual feature(s) 314, 415 from first digital content item 306a overlaid over second digital content item 306b (e.g., displayed in the background of graphical user interface 302).

As mentioned above, method 900 may include performing one or more searches in response to receiving user inputs identifying one or more visual features 310, 312. For example, in one or more embodiments, method 900 may include providing digital content item 306a, 306c, 506a from a collection of digital content items via graphical user interface 302. Additionally, method 900 may include receiving a first user input identifying a selection of first visual feature 314 of digital content item 306a, 306c, 506a. Method 900 may further include identifying a first set of one or more digital content items from the collection of digital content items having first visual feature 314. Method 900 may include providing access to the first set of one or more digital content items having first visual feature 314 via graphical user interface 302 (e.g., in response to receiving the first user input).

Additionally, method 900 may include receiving a second user input identifying a selection of second visual feature 415 from a digital content item from the first set of one or more digital content items having the first visual feature 314. Further, method 900 may include identifying (e.g., from the first set of digital content item(s) having the first visual feature 314) a second set of one or more digital content items having first visual feature 314 and second visual feature 415. Method 900 may further include providing access to second set of one or more digital content items having first visual feature 314 and second visual feature 415 via graphical user interface 302. As mentioned above, in one or more embodiments, first visual feature 314 may include a face of a person (e.g., first person 310) while second visual feature 415 includes a type of object.

Figure 10:
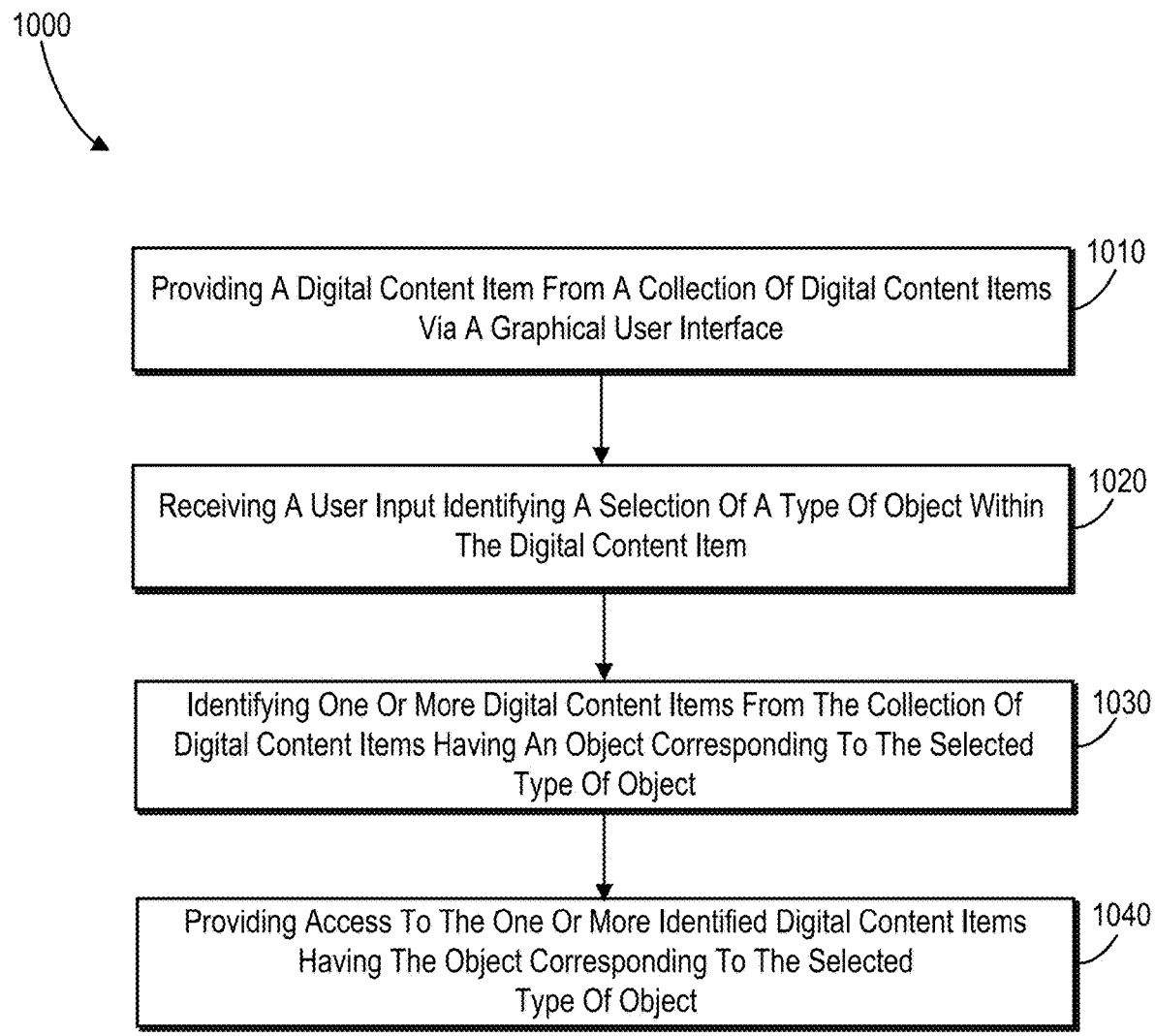
FIG. 10 illustrates a flowchart of a series of acts in another method of navigating digital content items in accordance with one or more embodiments.

FIG. 10 illustrates a flowchart of one example method 900 of identifying and providing digital content based on one or more identified types of objects within the digital content. While FIG. 10 illustrates example steps according to one embodiment, other embodiments may omit, add to, reorder, and/or modify any of the steps shown in FIG. 10. One or more steps shown in FIG. 10 may be performed by any of the components illustrated in system 100 illustrated in FIG. 1. Further, one or more steps of method 1000 may be performed by client device 102, server device 101, or a combination of both.

For example, method 1000 may include act 1010 of providing digital content item 306a, 306c, 506a from a collection of digital content items. Act 1010 may involve providing digital content item 306a, 306c, 506a via graphical user interface 302. Additionally, method 1000 may include act 1010 of receiving a user input identifying a selection of a type of object within digital content item 306a, 306c, 506a. For example, act 1020 may include detecting a user interaction with respect to graphical user interface 302 (e.g., identifying a portion or region of the digital content item 306a, 306c, 506a). Additionally, act 1020 may involve identifying visual feature 520, 521 based on the user interaction (e.g., identifying visual feature 520, 521 within the portion or region of digital content item 306a, 306c, 506a). Further, act 1020 may involve identifying a type of object corresponding to identified visual feature 520, 521.

Further, method 1000 may include act 1030 of identifying (e.g., by at least one processor) one or more digital content items from the collection of digital content items having an object corresponding to the selected type of object. In particular, act 1030 may involve identifying all digital content items that include any number of objects of the identified object type. For example, where user 104 selects a bicycle that appears within digital content item 306a, 306c, 506a, act 1030 may involve identifying each digital content item within the collection of digital content items that include any type of bicycle (e.g., mountain bike, road bike, motor bike).

As another example, act 1020 may involve receiving a selection of a face of a person. In this example, rather than associating the selection of the face with the specific person corresponding to the face, the selection of the face may correspond to a selection of a type of object that includes any faces within digital content items. In response, act 1030 may involve identifying one or more digital content items from the collection of digital content items including any objects corresponding to the type of object. For example, act 1030 may involve identifying each digital content item from the collection of digital content items that includes any faces. Additionally, acts 1020 and 1030 may involve receiving a selection of any object or type of object and identifying digital content item(s) that include any object(s) corresponding to the selected object and/or object type.

In one or more embodiments, method 1000 may include an act of performing object recognition on digital content items in the collection of digital content items to detect one or more types of objects within the digital content items of the collection of digital content items. Additionally, method 1000 may further include associating one or more tags with the digital content items. For example, method 1000 may involve associating digital content items with tags that indicate types of objects (or specific objects) that have been detected within given digital content items. For example, method 1000 may include associating any number of tags for each object or type of object detected within a respective digital content item. Additionally, in one or more embodiments, act 1030 may involve identifying a tag associated with the selected type of object and identifying digital content items from the collection of digital content items associated with the tag.

Additionally, as illustrated in FIG. 10, method 1000 may include act 1040 of providing access to one or more identified digital content items having the object corresponding to the selected type of object. For example, act 1040 may involve providing access to a file or database including the identified digital content items. Additionally, act 1040 may involve presenting a display of the identified digital content items via graphical user interface 302.

As mentioned above, method 100 may include an act of performing object recognition on digital content item 306a, 306c, 506a to detect one or more objects within digital content items of a collection of digital content items. Additionally, method 1000 may include an act of providing (e.g., via graphical user interface 302) one or more selectable options 626 corresponding to the detected one or more objects within digital content item 306a, 306c, 506a. For example, method 1000 may include providing listing 624 of selectable options 626 including various types of objects or other visual features included within digital content item 306a, 306c, 506a. In particular, method 1000 may include an act of providing (e.g., via graphical user interface 302) one or more selectable options 626 including one or more types of objects where the selectable types of objects correspond to the detected object(s) or types of objects within digital content item 306a, 306c, 506a. Further, act 1020 of receiving a user input identifying a selection of a type of object may involve receiving a user selection of at least one of the one or more selectable options 626.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
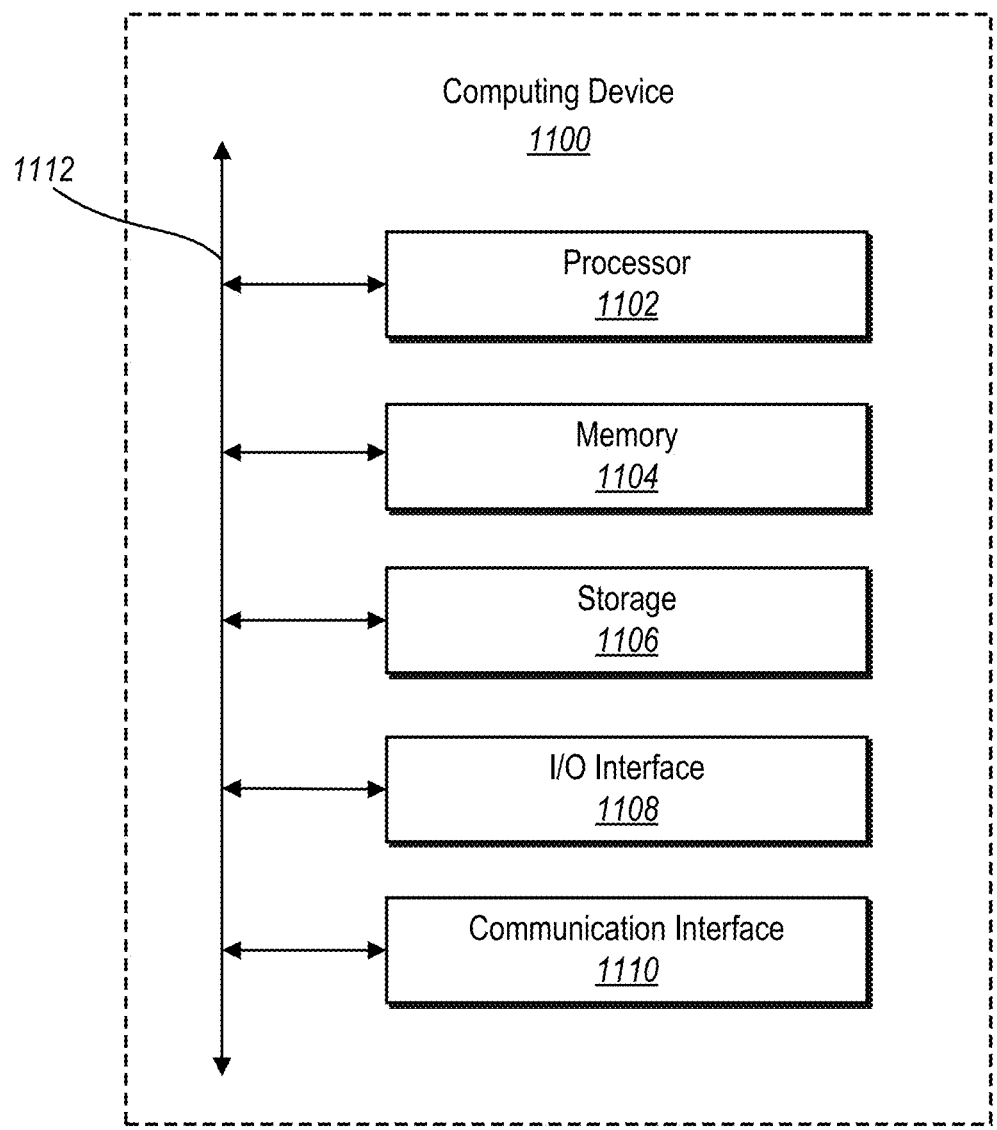
FIG. 11 illustrates a block diagram of a computing device in accordance with one or more embodiments.

FIG. 11 illustrates a block diagram of exemplary computing device 1100 that may be configured to perform one or more of the processes described above. One will appreciate that client devices 102, 300, 300, 300, 300, 300, 300, service device 101, and online content management system 106 each may be implemented by one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, computing device 1100 can include fewer components than those shown in FIG. 11. Components of computing device 1100 shown in FIG. 11 will now be described in additional detail.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular embodiments, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular embodiments, storage device 1106 is non-volatile, solid-state memory. In other embodiments, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
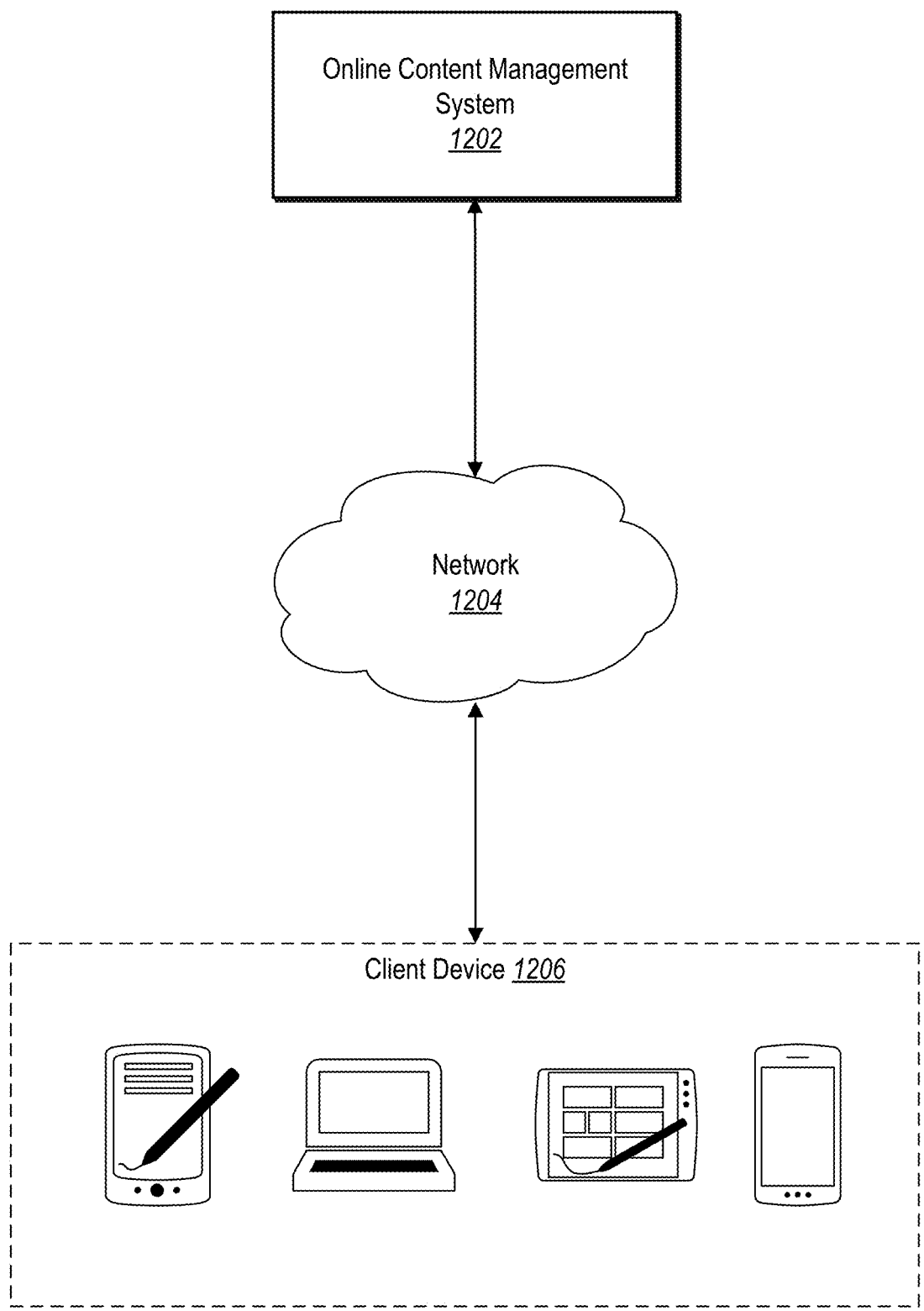
FIG. 12 illustrates a networking environment of an online content management system in accordance with one or more embodiments.

FIG. 12 is a schematic diagram illustrating an environment 1200 within which one or more embodiments of content management system 100 can be implemented. Online content management system 1202 may generate, store, manage, receive, and send digital content. For example, online content management system 1202 may send and receive digital content to and from client devices 1206 by way of network 1204. In particular, online content management system 1202 can store and manage a collection of digital content. Online content management system 1202 can manage the sharing of digital content between computing devices associated with a plurality of users. For instance, online content management system 1202 can facilitate a user sharing a digital content with another user of online content management system 1202.

In particular, online content management system 1202 can manage synchronizing digital content across multiple client devices 1206 associated with one or more users. For example, a user may edit digital content using client device 1206. The online content management system 1202 can cause client device 1206 to send the edited digital content to online content management system 1202. Online content management system 1202 then synchronizes the edited digital content on one or more additional computing devices.

In addition to synchronizing digital content across multiple devices, one or more embodiments of online content management system 1202 can provide an efficient storage option for users that have large collections of digital content. For example, online content management system 1202 can store a collection of digital content on online content management system 1202, while the client device 1206 only stores reduced-sized versions of the digital content. A user can navigate and browse the reduced-sized versions (e.g., a thumbnail of a digital image) of the digital content on client device 1206. In particular, one way in which a user can experience digital content is to browse the reduced-sized versions of the digital content on client device 1206.

Another way in which a user can experience digital content is to select a reduced-size version of digital content to request the full- or high-resolution version of digital content from online content management system 1202. In particular, upon a user selecting a reduced-sized version of digital content, client device 1206 sends a request to online content management system 1202 requesting the digital content associated with the reduced-sized version of the digital content. Online content management system 1202 can respond to the request by sending the digital content to client device 1206. Client device 1202, upon receiving the digital content, can then present the digital content to the user. In this way, a user can have access to large collections of digital content while minimizing the amount of resources used on client device 1206.

Client device 1206 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access online content management system 1202.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
providing, via a graphical user interface, a display of a digital content item stored on a memory device;
analyzing, by at least one processor, the digital content item;
based on analyzing the digital content item, identifying a plurality of visual features of the digital content item;
providing for display, via the graphical user interface, selectable options for the identified plurality of visual features, wherein the selectable options correspond to at least one of an object, a location, or a scene characteristic;
detecting a selection of one or more selectable options for one or more visual features from the identified plurality of visual features, wherein at least one of the one or more selectable options corresponds to a first object;
determining a first object type corresponding to the first object; and
providing for display a presentation of a plurality of additional digital content items comprising the one or more visual features, wherein at least one digital content item of the plurality of additional digital content items includes a second object of the first object type.

2. The method of claim 1, further comprising providing for display, within the graphical user interface, at least one additional selectable option corresponding to a face of a person within the digital content item.

3. The method of claim 1, further comprising generating a thumbnail image of each of the plurality of visual features.

4. The method of claim 3, further comprising overlaying one or more thumbnail images for the one or more visual features over the digital content item.

5. The method of claim 4, wherein the one or more thumbnail images depict the one or more visual features using a higher resolution than depicted by the digital content item.

6. The method of claim 3, further comprising at least one of:
correcting a color of at least one thumbnail image relative to the digital content item; or
correcting an alignment of at least one thumbnail image relative to the digital content item.

7. The method of claim 3, further comprising generating a thumbnail image of a visual feature from the plurality of visual features using a separate digital content item comprising the visual feature.

8. The method of claim 1, further comprising providing for display, within the graphical user interface, a visual indication of the selection of the one or more visual features, wherein a size of the visual indication corresponds to a size of the one or more visual features within the digital content item.

9. The method of claim 1, wherein providing for display the presentation of the plurality of additional digital content items comprises scrubbing through the plurality of additional digital content items in response to user input.

10. The method of claim 1, wherein providing for display, via the graphical user interface, selectable options for the identified plurality of visual features comprises providing for display, via the graphical user interface, a listing or drop-down menu of the selectable options.

11. The method of claim 1, further comprising, in response to the selection of one or more selectable options for the one or more visual features, providing for display a plurality of granular options associated with the one or more visual features.

12. A system comprising:
at least one processor; and
memory containing instructions thereon that, when executed by the at least one processor, cause the system to:
provide, via a graphical user interface, a display of a digital content item;
analyze the digital content item;
based on analyzing the digital content item, identify a plurality of visual features of the digital content item;
provide for display, via the graphical user interface, selectable options for the identified plurality of visual features, wherein the selectable options correspond to at least one of an object, a location, or a scene characteristic;
detect a selection of one or more selectable options for one or more visual features from the identified plurality of visual features, wherein at least one of the one or more selectable options corresponds to a first object;
determine a first object type corresponding to the first object; and
provide for display a presentation of a plurality of additional digital content items comprising the one or more visual features, wherein at least one digital content item of the plurality of additional digital content items includes a second object of the first object type.

13. The system of claim 12, further comprising instructions that, when executed by the at least one processor, cause the system to:
provide for display, within the graphical user interface, a visual indication of the selection of the one or more visual features.

14. The system of claim 13, further comprising instructions that, when executed by the at least one processor, cause the system to:
generate a thumbnail image of each of the plurality of visual features,
wherein providing for display the visual indication of the selection of the one or more visual features comprises overlaying one or more thumbnail images for the one or more visual features over the digital content item.

15. The system of claim 14, further comprising instructions that, when executed by the at least one processor, cause the system to:
position the one or more thumbnail images over the one or more visual features within the digital content item.

16. The system of claim 13, wherein a size and a location of the visual indication corresponds to a size and a location of a visual feature within the digital content item.

17. A non-transitory computer-readable medium storing instructions thereon that, when executed by at least one processor, cause at least one computing device to:
provide, via a graphical user interface, a display of a digital content item;
analyze the digital content item;
based on analyzing the digital content item, identify a plurality of visual features of the digital content item;
detect a selection of one or more selectable options for one or more visual features from the identified plurality of visual features, wherein the one or more selectable options correspond to at least one of an object, a location, or a scene characteristic, and wherein at least one of the one or more selectable options corresponds to a first object;
determine a first object type corresponding to the first object; and
provide for display a presentation of a plurality of additional digital content items comprising the one or more visual features, wherein at least one digital content item of the plurality of additional digital content items includes a second object of the first object type.

18. The non-transitory computer-readable medium as recited by claim 17, wherein providing for display the presentation of the plurality of additional digital content items comprises scrubbing through the plurality of additional digital content items in response to user input.

19. The non-transitory computer-readable medium as recited by claim 17, further storing instructions that, when executed by the at least one processor, cause the at least one computing device to:
provide for display, within the graphical user interface, a visual indication of a selection of a visual feature, wherein a location and a size of the visual indication corresponds to a location and a size of the visual feature within the digital content item.

20. The non-transitory computer-readable medium as recited by claim 17, further storing instructions that, when executed by the at least one processor, cause the at least one computing device to:
in response to the selection of one or more selectable options for the one or more visual features, provide for display a plurality of granular options associated with the one or more visual features.

* * * * *